(12) United States Patent
Yang et al.

(10) Patent No.: US 11,335,740 B2
(45) Date of Patent: May 17, 2022

(54) DISPLAY ASSEMBLY, ELECTRONIC DEVICE, AND METHOD FOR ASSEMBLING DISPLAY ASSEMBLY

(71) Applicant: GUANGDONG OPPO MOBILE TELECOMMUNICATIONS CORP., LTD., Guangdong (CN)

(72) Inventors: Zimei Yang, Guangdong (CN); Ke Ran, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 93 days.

(21) Appl. No.: 16/908,019

(22) Filed: Jun. 22, 2020

(65) Prior Publication Data
US 2020/0411599 A1 Dec. 31, 2020

(30) Foreign Application Priority Data

Jun. 25, 2019 (CN) .......................... 201910554754.4

(51) Int. Cl.
*H01L 27/32* (2006.01)
*H01L 51/52* (2006.01)
*G06V 40/13* (2022.01)

(52) U.S. Cl.
CPC ........ *H01L 27/323* (2013.01); *G06V 40/1306* (2022.01); *H01L 51/5246* (2013.01); *H01L 51/5293* (2013.01); *H01L 2251/308* (2013.01); *H01L 2251/5338* (2013.01)

(58) Field of Classification Search
CPC ............... H01L 27/323; H01L 51/5246; H01L 51/5293; G06K 9/0002

USPC ............................... 345/156; 349/12; 436/73
See application file for complete search history.

(56) References Cited

U.S. PATENT DOCUMENTS

| | | | | |
|---|---|---|---|---|
| 9,336,428 | B2* | 5/2016 | Erhart | G06K 9/00053 |
| 2012/0199625 | A1* | 8/2012 | Qi | B28D 1/225 |
| | | | | 225/2 |
| 2015/0036065 | A1* | 2/2015 | Yousefpor | H04M 1/0266 |
| | | | | 349/12 |
| 2015/0037897 | A1* | 2/2015 | Prabhu | C30B 33/10 |
| | | | | 436/73 |

(Continued)

FOREIGN PATENT DOCUMENTS

| | | |
|---|---|---|
| CN | 104794428 A | 7/2015 |
| CN | 204480268 U | 7/2015 |

(Continued)

OTHER PUBLICATIONS

Chinese Second Office Action with English Translation for CN Application 201910554754.4 dated Apr. 12, 2021. (17 pages).

(Continued)

*Primary Examiner* — Prabodh M Dharia
(74) *Attorney, Agent, or Firm* — Young Basile Hanlon & MacFarlane, P.C.

(57) ABSTRACT

A display assembly, an electronic device, and a method for assembling a display assembly are provided. The display assembly includes a flexible screen, a cover plate, and a capacitive fingerprint sensor film. The capacitive fingerprint sensor film is disposed between the cover plate and the flexible screen and covers a display surface of the flexible screen, to sense a fingerprint of a finger in contact with the cover plate.

19 Claims, 15 Drawing Sheets

(56) References Cited

U.S. PATENT DOCUMENTS

| | | | |
|---|---|---|---|
| 2018/0129853 A1 | 5/2018 | Lee et al. | |
| 2018/0285614 A1 | 10/2018 | Shen et al. | |
| 2019/0026527 A1* | 1/2019 | He | G02B 6/0026 |
| 2019/0042017 A1 | 2/2019 | Lu | |
| 2019/0102020 A1 | 4/2019 | Suzuki et al. | |

FOREIGN PATENT DOCUMENTS

| | | | | |
|---|---|---|---|---|
| CN | 105389067 | * | 3/2016 | ............. G06F 3/044 |
| CN | 105389067 A | | 3/2016 | |
| CN | 105488499 A | | 4/2016 | |
| CN | 105631421 A | | 6/2016 | |
| CN | 106709455 A | | 5/2017 | |
| CN | 106980427 A | | 7/2017 | |
| CN | 107819910 A | | 3/2018 | |
| CN | 207148471 | * | 3/2018 | ........... G02F 1/1333 |
| CN | 207148471 U | | 3/2018 | |
| CN | 208141412 U | | 11/2018 | |
| CN | 208172813 U | | 11/2018 | |
| EP | 2685360 A2 | | 1/2014 | |
| EP | 3358455 A1 | | 8/2018 | |

OTHER PUBLICATIONS

ISR issued in corresponding international application No. PCT/CN2020/096971 dated Sep. 23, 2020.

EESR issued in corresponding European application No. 20181336.7 dated Oct. 27, 2020.

The first OA with English Translation issued in corresponding CN application No. 201910554754.4 dated Dec. 3, 2020.

Chinese Third Office Action with English Translation for CN Application 201910554754.4 dated Jul. 2, 2021. (15 pages).

Indian Examination Report for IN Application 202014026233 dated Jul. 23, 2021. (8 pages).

Chinese Office Action with English Translation for CN Application 201910554754.4 dated Sep. 3, 2021. (20 pages).

\* cited by examiner

DISPLAY ASSEMBLY, ELECTRONIC DEVICE, AND METHOD FOR ASSEMBLING DISPLAY ASSEMBLY

CROSS-REFERENCE TO RELATED APPLICATION(S)

This application claims priority to Chinese Patent Application Serial No. 201910554754.4, filed on Jun. 25, 2019, the entire disclosure of which is hereby incorporated by reference.

TECHNICAL FIELD

This disclosure relates to the technical field of fingerprint recognition, and particularly to a display assembly, an electronic device, and a method for assembling a display assembly.

BACKGROUND

With the continuous development of smart mobile terminal technologies, fingerprint recognition is widely used. For example, fingerprint recognition can be used for screen unlocking, quick payment, encryption, and fingerprint key functions. The present fingerprint recognition solution mainly includes local under-screen optical fingerprint recognition for fingerprints on part of a screen. During optical fingerprint recognition, a fingerprint image is collected via a camera, and then the fingerprint image is compared with an enrollment fingerprint in a system. If the fingerprint image collected matches the enrollment fingerprint, the fingerprint recognition succeeds. However, the camera is relatively large, and thus a lot of space is occupied.

SUMMARY

Implementations provide a display assembly. The display assembly includes a flexible screen, a cover plate, and a capacitive fingerprint sensor film. The capacitive fingerprint sensor film is disposed between the cover plate and the flexible screen, where the capacitive fingerprint sensor film covers a display surface of the flexible screen, to sense a fingerprint of a finger in contact with the cover plate.

Implementations further provide an electronic device. The electronic device includes a display assembly and a casing coupled with the display assembly. The display assembly includes a flexible screen, a capacitive fingerprint sensor film, and a cover plate. The capacitive fingerprint sensor film is disposed between the cover plate and the flexible screen, where the capacitive fingerprint sensor film covers a display surface of the flexible screen, to sense a fingerprint of a finger in contact with the cover plate.

Implementations further provide a method for assembling a display assembly. The method includes the following. A flexible screen, a capacitive fingerprint sensor film, and a cover plate are provided. The capacitive fingerprint sensor film is arranged between the cover plate and the flexible screen, and the capacitive fingerprint sensor film covers a display surface of the flexible screen, so as to sense a fingerprint of a finger in contact with the cover plate.

BRIEF DESCRIPTION OF THE DRAWINGS

The described-above and/or additional aspects and advantages of the implementations will become apparent and be easily understood from the description of the implementations in conjunction with the following drawings.

DETAILED DESCRIPTION

Figure 1:
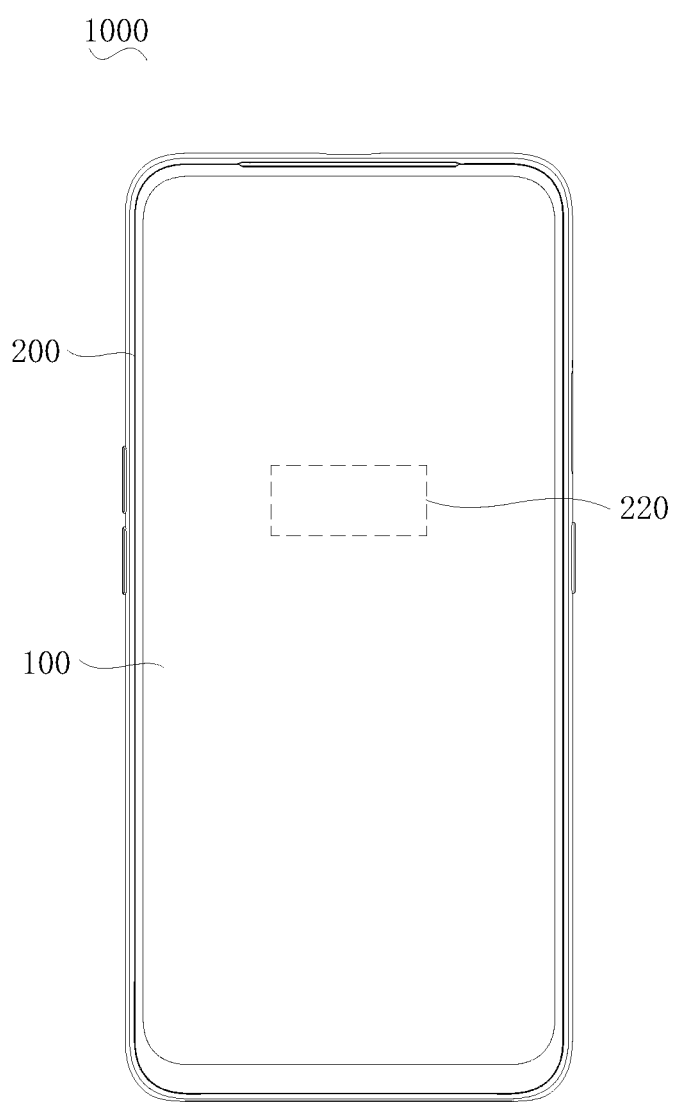
FIG. 1 to FIG. 2 are schematic structural views illustrating an electronic device according to implementations.

The following describes implementations in detail. Examples of the implementations are illustrated in the accompanying drawings, where the same or like reference numerals represent the same or like elements or elements having the same or similar functions. The implementations described below with reference to the accompanying drawings are illustrative and are merely intended to explain the disclosure rather than limit the disclosure.

As illustrated in FIG. 1, an electronic device 1000 includes a casing 200 and a display assembly 100 coupled with the casing 200. The electronic device 1000 may be a mobile phone, a tablet computer, a display, a notebook computer, a teller machine, a gate, a smart watch, a headset device, a game console, or the like. The following describes a mobile phone as an example of the electronic device 1000, and the electronic device 1000 is not limited to a mobile phone.

Figure 2:
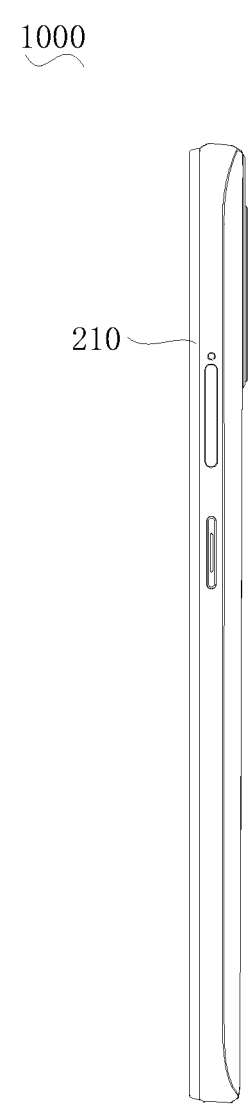

The casing 200 is used for accommodating the display assembly 100. That is, the casing 200 may be used as a carrier for the display assembly 100. As illustrated in FIG. 2, the casing 200 includes a front casing 210, and the display assembly 100 may be coupled with the front casing 210 in a glue dispensing or adhesive manner. In addition, a power supply device, an imaging device, a communication device, and other functional modules of the electronic device 1000 can also be received in the casing 200, such that the casing 200 can provide dust-proof protection, anti-breaking protection, water-proof protection, and other protection for the functional modules.

Figure 3:
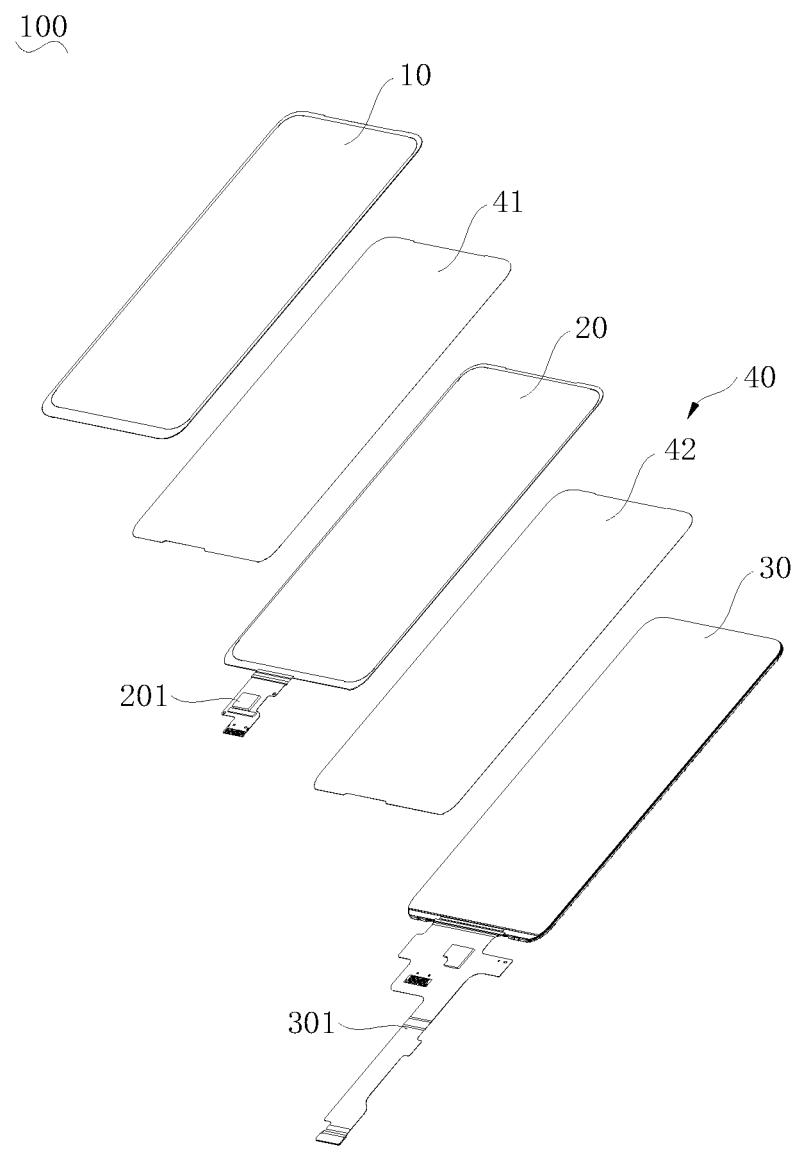
FIG. 3 is an exploded view of a display assembly according to implementations.
Figure 4:
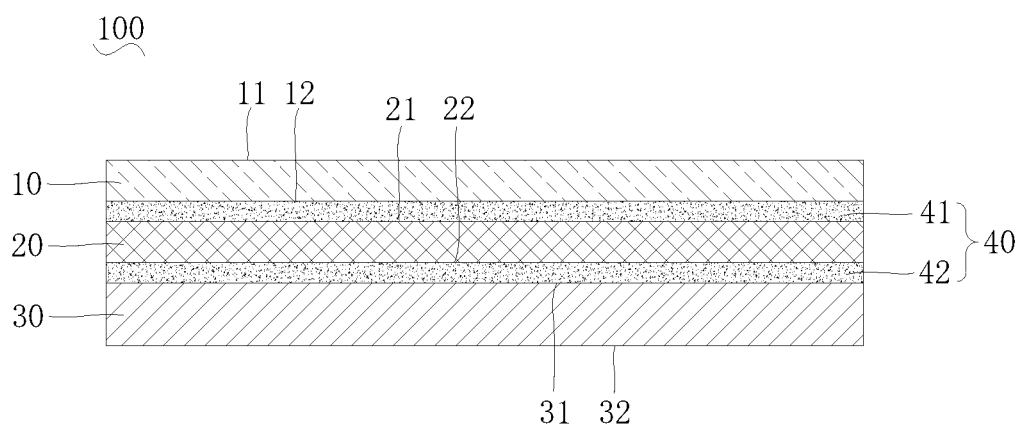
FIG. 4 to FIG. 6 are schematic cross-sectional views of a display assembly according to implementations.

As illustrated in FIG. 3 and FIG. 4, the display assembly 100 includes a display module 30, a capacitive fingerprint sensor film 20, and a cover plate 10. The capacitive fingerprint sensor film 20 is disposed between the cover plate 10 and the display module 30. The capacitive fingerprint sensor film 20 covers a display surface of the display module 30 to sense a fingerprint of a finger in contact with the cover plate 10.

In the display assembly 100 and the electronic device 1000, the capacitive fingerprint sensor film 20 covers the display surface 31, such that full-screen fingerprint recognition can be achieved. Compared with local fingerprint recognition, the operation is more convenient. In addition, compared with optical fingerprint recognition, when the capacitive fingerprint sensor film 20 is used for fingerprint recognition, a relatively large camera is not needed, and only the capacitive fingerprint sensor film 20 is needed, such that the electronic device is thin and design of the electronic device 1000 is simple.

In one example, the capacitive fingerprint sensor film 20 is a full-screen capacitive fingerprint sensor film. "Full-screen" refers to that the capacitive fingerprint sensor film 20 covers up to a predetermined percentage of the display surface 31. For example, the capacitive fingerprint sensor film 20 covers up to 80%, 85%, 90%, 91%, 92%, 93%, 94%, 95%, 96%, 97%, 98%, 99%, or 100% of the display surface 31. Moreover, the capacitive fingerprint sensor film 20 may be larger than the display surface 31 and cover up to 100% of the display surface 31. In this case, the capacitive fingerprint sensor film 20 covers the whole display surface 31 and extends beyond edges of the display surface 31.

As illustrated in FIG. 3 and FIG. 4, in at least one implementation, the display assembly 100 includes the cover plate 10, the capacitive fingerprint sensor film 20, the display module 30, and an adhesive layer 40.

In one example, the display assembly 100 has a light-exiting direction, and the display module 30, the capacitive fingerprint sensor film 20, and the cover plate 10 are stacked together in the light-exiting direction. In other words, the cover plate 10, the capacitive fingerprint sensor film 20, and the display module 30 are stacked together in a direction opposite the light-exiting direction. According to implementations, the light-exiting direction of the display assembly 100 is a light-exiting direction of the display module 30.

The cover plate 10 can protect the capacitive fingerprint sensor film 20. In at least one implementation, the cover plate 10 is made of at least one of Sapphire, glass, or a composite board, or made from at least one of Polyimide (PI) or Polyethylene terephthalate (PET), where the composite board is made from Polymethyl methacrylate (PMMA) and Polycarbonate (PC).

As one example, the cover plate 10 is made of Sapphire. Sapphire is a collective name for corundum gemstones of other colors other than ruby. Sapphire has high hardness, high transparency (about 85%), low dielectric constant (9.3-11.5), and other advantages. When the cover plate 10 is made of Sapphire, the cover plate 10 has high hardness, high strength, a good sandpaper dropping effect (for example, the cover plate 10 is not susceptible to damage when the electronic device 1000 falls to the cement ground from the 1.2 m height), high scratch resistance, and the like. Generally, when the cover plate 10 is made of Sapphire, a thickness of the cover plate 10 ranges from 0.2 mm to 0.5 mm. That is, the thickness of the cover plate 10 is any value between 0.2 mm and 0.5 mm. For example, the thickness of the cover plate 10 is 0.2 mm, 0.23 mm, 0.26 mm, 0.29 mm, 0.32 mm, 0.35 mm, 0.38 mm, 0.41 mm, 0.44 mm, 0.47 mm, 0.5 mm, or the like.

As another example, the cover plate 10 is made of glass. When the cover plate 10 is made of glass, the cover plate 10 has high strength and the cost of manufacturing the cover plate 10 is low. Generally, when the cover plate 10 is made of glass, the thickness of the cover plate 10 ranges from 0.1 mm to 0.4 mm. That is, the thickness of the cover plate 10 is any value between 0.1 mm and 0.4 mm. For example, the thickness of the cover plate 10 is 0.1 mm, 0.13 mm, 0.16 mm, 0.19 mm, 0.22 mm, 0.25 mm, 0.28 mm, 0.31 mm, 0.34 mm, 0.37 mm, or 0.4 mm.

As yet another example, the cover plate 10 is made from PI. When the cover plate 10 is made from PI, the cover plate 10 is flexible, and the cover plate 10 has a good sandpaper dropping effect. Generally, when the cover plate 10 is made from PI, the thickness of the cover plate 10 ranges from 0.1 mm to 0.3 mm. That is, the thickness of the cover plate 10 is any value between 0.1 mm and 0.3 mm. For example, the thickness of the cover plate 10 is 0.1 mm, 0.12 mm, 0.14 mm, 0.16 mm, 0.18 mm, 0.2 mm, 0.22 mm, 0.24 mm, 0.26 mm, 0.28 mm, or 0.3 mm.

As yet another example, the cover plate 10 is made from PET. When the cover plate 10 is made from PET, the cover plate 10 is flexible, and the cover plate 10 has a good sandpaper dropping effect. Generally, when the cover plate 10 is made from PET, a thickness of the cover plate 10 ranges from 0.1 mm to 0.3 mm. That is, the thickness of the cover plate 10 is any value between 0.1 mm and 0.3 mm. For example, the thickness of the cover plate 10 is 0.1 mm, 0.12 mm, 0.14 mm, 0.16 mm, 0.18 mm, 0.2 mm, 0.22 mm, 0.24 mm, 0.26 mm, 0.28 mm, or 0.3 mm.

As yet another example, the cover plate 10 is made of a composite board. The composite board is formed by PMMA and PC through welding, pressing, and other processes. Since PMMA has high scratch resistance and PC is good in toughness, when the cover plate 10 is made from a composite board, the cover plate 10 has high scratch resistance and good toughness. Generally, when the cover plate 10 is made from a composite board, the thickness of the cover plate 10 ranges from 0.1 mm to 0.4 mm. That is, the thickness of the cover plate 10 is any value between 0.1 mm and 0.4 mm. For example, the thickness of the cover plate 10 is 0.1 mm, 0.13 mm, 0.16 mm, 0.19 mm, 0.22 mm, 0.25 mm, 0.28 mm, 0.31 mm, 0.34 mm, 0.37 mm, or 0.4 mm, where a thickness of PMMA is about 0.07 mm.

It is to be understood that when the cover plate 10 is pressed by a user's finger, the electronic device 1000 performs fingerprint recognition. As one example, if the cover plate 10 is relatively thick, the sensitivity of the capacitive fingerprint sensor film 20 may be affected, and the electronic device 1000 is not thin. As another example, if the cover plate 10 is relatively thin, the cover plate 10 cannot protect the capacitive fingerprint sensor film 20 well when the cover plate 10 is pressed by the user's finger. Therefore, when the material and thickness of the cover plate 10 satisfy the conditions described in above implementations, the sensitivity of the capacitive fingerprint sensor film 20 can be ensured, the electronic device 1000 can be made to be thin, and the cover plate 10 can protect the capacitive fingerprint sensor film 20 when the cover plate 10 is pressed by the user's finger.

Figure 5:
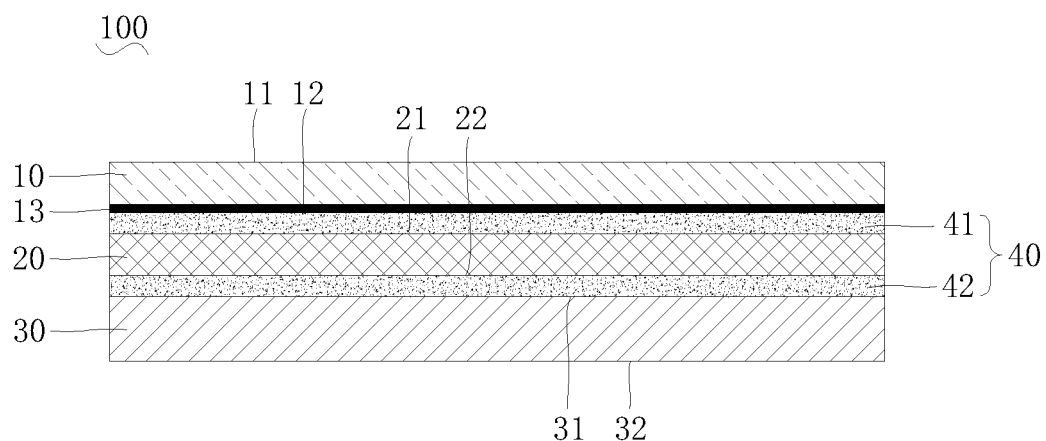

As illustrated in FIG. 5, the cover plate 10 has a light-exiting surface 11 and a back surface 12 opposite the light-exiting surface 11. The back surface 12 of the cover plate 10 faces the capacitive fingerprint sensor film 20, and the back surface 12 of the cover plate 10 is provided with an ink layer 13. In one example, the ink layer 13 can be formed on the back surface 12 of the cover plate 10 through the screen printing process. The ink layer 13 has a high attenuation for visible light, for example, a attenuation rate can reach more than 70%, such that a region covered by ink is invisible when the electronic device 1000 is in normal use. For example, the capacitive fingerprint sensor film 20 and the display module 30 inside the electronic device 1000 are invisible through the cover plate 10, such that the appearance of the electronic device 1000 is beautiful.

In one example, a thickness of the ink layer 13 is smaller than or equal to 0.2 mm. When the thickness of the ink layer 13 is smaller than or equal to 0.2 mm, the display assembly 100 is relatively thin, and accordingly the electronic device 1000 is relatively thin.

Referring back to FIG. 4, the capacitive fingerprint sensor film 20 is disposed between the cover plate 10 and the display module 30 and covers the display surface 31 of the display module 30 to sense a fingerprint of a finger in contact with the cover plate 10. The capacitive fingerprint sensor film 20 is attached to the cover plate 10 (for example, the back surface 12 of the cover plate 10) via the adhesive layer 40. The capacitive fingerprint sensor film 20 has a light-exiting surface 21 and a back surface 22 opposite the light-exiting surface 21. The light-exiting surface 21 of the capacitive fingerprint sensor film 20 faces the cover plate 10 (for example, the back surface 12 of the cover plate 10). The back surface 22 of the capacitive fingerprint sensor film 20 faces the display module 30.

In some implementations, the capacitive fingerprint sensor film 20 may cover the whole display surface 31 to implement a full-screen fingerprint recognition function. That is, the capacitive fingerprint sensor film 20 can cover up to 100% of the display surface 31, or the capacitive fingerprint sensor film 20 covers the whole display surface 31 and extends beyond the edges of the display surface 31. Since the capacitive fingerprint sensor film 20 covers the whole display surface 31, the fingerprint recognition can be achieved when any position rather than some specific positions of the display module 30 is pressed by the user, such that the operation is convenient. In addition, multiple positions of the display module 30 can be pressed synchronously or sequentially by multiple fingers of one user to perform fingerprint recognition for multiple fingerprints. Alternatively, multiple positions of the display module 30 can be pressed synchronously or sequentially by multiple fingers of multiple users to perform fingerprint recognition for multiple fingerprints, thereby enhancing the security level of encryption and unlocking of the electronic device 1000.

Figure 6:
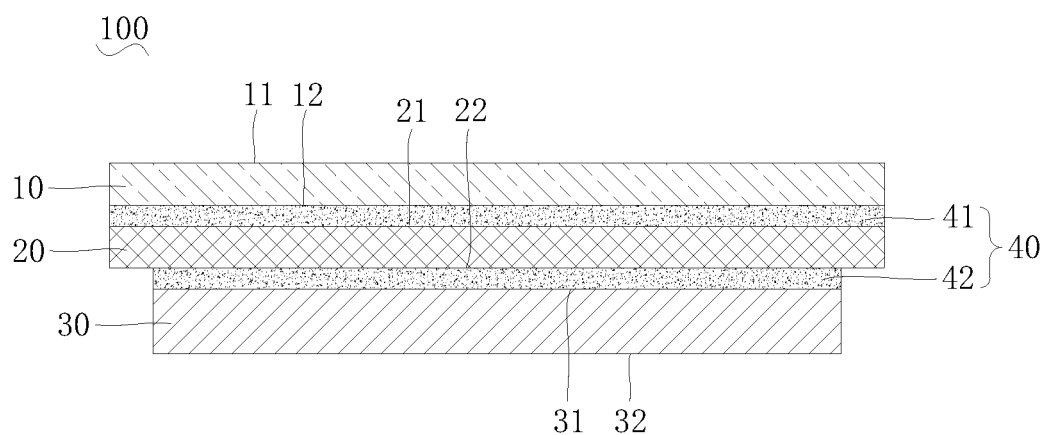

As illustrated in FIG. 4, the capacitive fingerprint sensor film 20 covers the whole display surface 31 (i.e., the capacitive fingerprint sensor film 20 covers up to 100% of the display surface 31). In this case, edges of the capacitive fingerprint sensor film 20 and the edges of the display module 30 are aligned, which can be beneficial for ensuring the stability of the coupling between the capacitive fingerprint sensor film 20 and the display module 30. Furthermore, a capacitive fingerprint recognition function of the whole display module 30 can be achieved by the capacitive fingerprint sensor film 20 having a small area. As illustrated in FIG. 6, the capacitive fingerprint sensor film 20 covers the whole display surface 31 and extends beyond the edges of the display surface 31 (i.e., the capacitive fingerprint sensor film 20 has a size larger than the display surface 31 and fully covers the display surface 31), to ensure the reliability of the fingerprint recognition at the edges of the display module 30.

In one example, the thickness of the capacitive fingerprint sensor film 20 is about 0.3 mm. The capacitive fingerprint sensor film 20 is made of glass or made from PI, and a sensor substrate 28 described below is also made of glass or made from PI. A circuit of the capacitive fingerprint sensor film 20 is made from at least one of metal, Indium tin oxide (ITO), or Nano silver paste, and a sensor circuit layer 29 described below is also made from at least one of metal, ITO, or Nano silver paste. When the capacitive fingerprint sensor film 20 is made of glass or made from PI, the circuit of the capacitive fingerprint sensor film 20 can be made from any of the materials for the circuit of the capacitive fingerprint sensor film 20. For example, when the capacitive fingerprint sensor film 20 is made of glass, the circuit of the capacitive fingerprint sensor film 20 is made of metal. For another example, the capacitive fingerprint sensor film 20 is made of glass, and the circuit of the capacitive fingerprint sensor film 20 is made from ITO. For yet another example, the capacitive fingerprint sensor film 20 is made of glass, and the circuit of the capacitive fingerprint sensor film 20 is made from Nano silver paste. For yet another example, the capacitive fingerprint sensor film 20 is made from PI, and the circuit of the capacitive fingerprint sensor film 20 is made of metal. For yet another example, the capacitive fingerprint sensor film 20 is made from PI, and the circuit of the capacitive fingerprint sensor film 20 is made from ITO. For yet another example, the capacitive fingerprint sensor film 20 is made from PI, and the circuit of the capacitive fingerprint sensor film 20 is made from Nano silver paste. The disclosure is not limited thereto.

Figure 7:
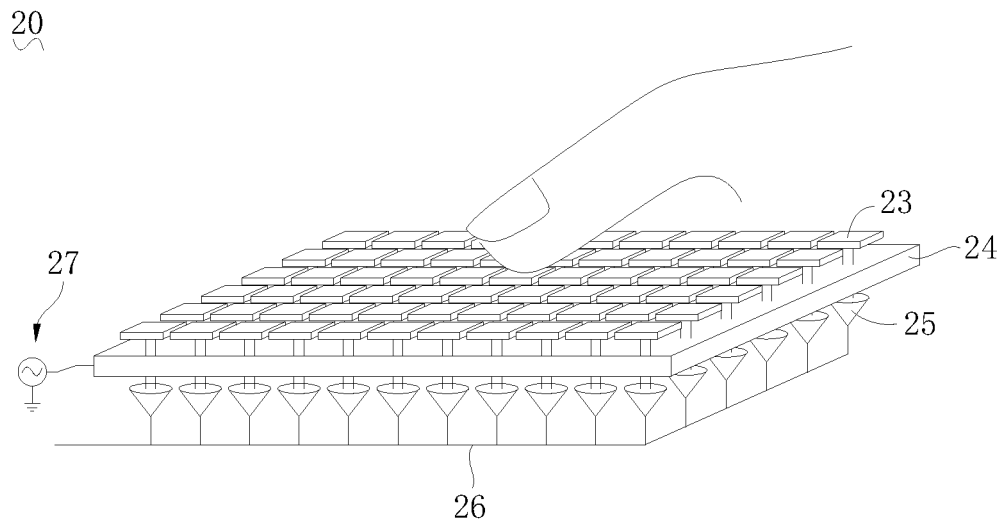
FIG. 7 is a schematic structural view of a capacitive fingerprint sensor film according to implementations.

As illustrated in FIG. 7, the capacitive fingerprint sensor film 20 may include pixel sensors 23, a sensor board 24, pixel amplifiers 25, output lines 26, and a power supply 27. The pixel sensors 23 are disposed on the sensor board 24. The pixel sensors 23 can be arranged in an array. In one example, the capacitive fingerprint sensor film 20 includes 100*100 pixel sensors 23, which can be miniature pixel sensors. The pixel sensors 23 are arranged on one side of the sensor board 24, and the pixel amplifiers 25 and the output lines 26 are arranged on the other side of the sensor board 24. The pixel amplifier 25 is configured to amplify signal of the pixel sensor 23 and output the signal amplified through the output line 26. Multiple output lines 26 may be included, and each pixel sensor 23 corresponds to one pixel amplifier 25 and one output line 26 in terms of position. The power supply 27 is coupled with the sensor board 24 and used for applying a voltage to form an electric field. The power supply 27 may be disposed on the sensor board 24, or may not be disposed on the sensor board 24. When the power supply 27 is disposed on the sensor board 24, the power supply 27 is coupled with the sensor board 24 in the welding or the lamination manner. The capacitive fingerprint sensor film 20 further includes a semiconductor substrate (not illustrated in the figures). The semiconductor substrate faces the sensor board 24. The semiconductor substrate, the pixel amplifier 25, and the output circuit 26 are arranged on the same side of the sensor board 24, and the pixel amplifier 25 and the output circuit 26 are both arranged on the semiconductor substrate. One side of the sensor board 24 where the pixel sensor 23 is disposed may be determined as the light-exiting surface 21 of the capacitive fingerprint sensor film 20, and the other side of the sensor board 24 where the semiconductor substrate is disposed may be determined as the back surface 22 of the capacitive fingerprint sensor film 20. It is worth noting that the structure of the capacitive fingerprint sensor film 20 in FIG. 7 is merely illustrated as an example, and the capacitive fingerprint sensor film 20 may have other structures in other implementations.

When the cover plate 10 is pressed by the user's finger, the capacitive fingerprint sensor film 20 is pressed, the pixel sensor 23 disposed under the pressed part of the capacitive fingerprint sensor film 20 forms an electrode plate of a capacitor, and skin on the finger constitutes the other electrode plate of the capacitor, and thus the electronic device 1000 performs fingerprint recognition. Since the finger has concave points (i.e., valleys of the fingerprint) and convex points (i.e., ridges of the fingerprint), a distance between a convex point and a pixel sensor 23 facing the convex point is not the same as that between a concave point and a pixel sensor 23 facing the concave point, and thus different capacitance values may be formed at the convex points and the concave points. As such, a fingerprint image can be obtained according to the capacitance values.

The capacitive fingerprint sensor film 20 may obtain a fingerprint image according to the capacitance values, and fingerprint recognition can be performed according to the fingerprint image. Compared with optical fingerprint recognition for the capacitance fingerprint recognition, the recognition speed is higher, the sensitivity is higher, and the fingerprint image may be collected without participation of light from the display module 30. In addition, fingerprint recognition can be performed in dark scenes, and thus a LCM can be adopted, such that the cost may be reduced.

As illustrated in FIG. 4, the display module 30 is used for displaying pictures, videos, characters, and other information. The display module 30 is attached to the capacitive fingerprint sensor film 20 (for example, the back surface 22 of the capacitive fingerprint sensor film 20) via the adhesive layer 40. The display module 30 has a display surface 31 and a back surface 32 opposite the display surface 31. The display surface 31 of the display module 30 faces the capacitive fingerprint sensor film 20 (for example, the back surface 22 of the capacitive fingerprint sensor film 20). According to implementations, when the capacitive fingerprint sensor film 20 covers up to just 100% of the whole display surface 31, an area of the back surface 22 of the capacitive fingerprint sensor film 20 is equal to that of the display surface 31 (as illustrated in FIG. 4). In other words, a length of the back surface 22 of the capacitive fingerprint sensor film 20 is equal to that of the display surface 31, and a width of the back surface 22 of the capacitive fingerprint sensor film 20 is equal to that of the display surface 31. When the capacitive fingerprint sensor film 20 covers the whole display surface and extends beyond the edges of the display surface 31, an area of the back surface 22 of the capacitive fingerprint sensor film 20 is larger than that of the display surface 31 (as illustrated in FIG. 6). For example, a length of the back surface 22 of the capacitive fingerprint sensor film 20 is larger than that of the display surface 31, and a width of the back surface 22 of the capacitive fingerprint sensor film 20 is equal to that of the display surface 31. For another example, a length of the back surface 22 of the capacitive fingerprint sensor film 20 is equal to that of the display surface 31, and a width of the back surface 22 of the capacitive fingerprint sensor film 20 is larger than that of the display surface 31. For yet another example, a length of the back surface 22 of the capacitive fingerprint sensor film 20 is larger than that of the display surface 31, and a width of the back surface 22 of the capacitive fingerprint sensor film 20 is larger than that of the display surface 31.

In some examples, the display module 30 is a rigid screen or a flexible screen. As one example, when the display module 30 is a rigid screen, the capacitive fingerprint sensor film 20 is made of glass, such that the cost may be reduced, and the circuit of the capacitive fingerprint sensor film 20 is made from at least one of metal, ITO, or Nano silver paste. As another example, when the display module 30 is a flexible screen, the capacitive fingerprint sensor film 20 is made from PI to form a flexible sensor, and the circuit of the capacitive fingerprint sensor film 20 is made from ITO or Nano silver paste to form a flexible circuit. It should be noted that, when the display module 30 is a rigid screen, the capacitive fingerprint sensor film 20 can be made from PI, and the disclosure is not limited thereto.

Figure 8:
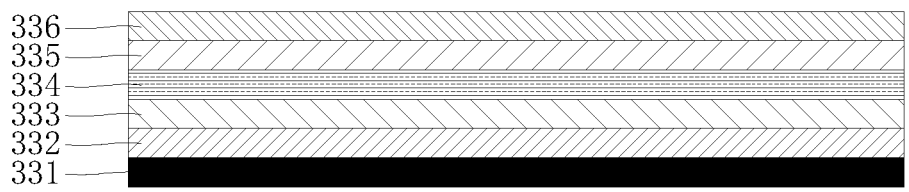
FIG. 8 is a cross-sectional view of a liquid crystal display module (LCM) according to implementations.
Figure 9:
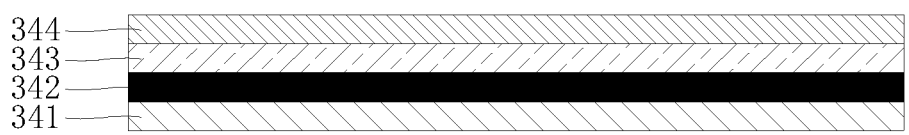
FIG. 9 is a cross-sectional view of an organic light-emitting diode (OLED) display according to implementations.

As illustrated in FIG. 8 and FIG. 9, the display module 30 is a liquid crystal display module (LCM) 33 or an organic light-emitting diode (OLED) display 34. Since the capacitive fingerprint sensor film 20 performs fingerprint recognition according to the capacitance values and the fingerprint image is collected without participation of light from the display module 30, the capacitive fingerprint recognition function can be achieved under a condition that the display module 30 is the LCM 33, the OLED display 34, or other display screens. That is, the display module 30 is not limited to the OLED display 34.

As illustrated in FIG. 8, when the display module 30 is the LCM 33, it is beneficial for reducing the cost of the electronic device 1000 (since LCM is usually cheaper than OLED for displays). The LCM 33 may include a backlight module 331, a lower polarizer 332, a thin film transistor (TFT) substrate 333, a liquid crystal layer 334, a color filter 335, and an upper polarizer 336 that are sequentially stacked together in the light-exiting direction of the display assembly 100. A surface of the upper polarizer 336 away from the color filter 335 is regarded as the display surface 31, and a surface of the backlight module 331 away from the lower polarizer 332 is regarded as the back surface 32 of the display module 30. The LCM 33 emits light through the backlight module 331. The light sequentially passes through the lower polarizer 332, the TFT substrate 333, the liquid crystal layer 334, the color filter 335, the upper polarizer 336, the capacitive fingerprint sensor film 20, and the cover plate 10 to reach the outside, and is then perceived by the user, so that the user can view the information displayed by the display module 30.

As illustrated in FIG. 9, when the display module 30 is an OLED display 34, a curved screen or other screens may be formed to provide various choices for the user. The OLED display 34 may include a glass TFT substrate 341, an OLED 342, a encapsulation glass 343, and an OLED polarizer 344 that are sequentially stacked together in the light-exiting direction of the display assembly 100. A surface of the OLED polarizer 344 away from the encapsulation glass 343 is regarded as the display surface 31, and a surface of the glass TFT substrate 341 away from the OLED 342 is regarded as the back surface 32 of the display module 30. The OLED display 34 emits light through the OLED 342. The light sequentially passes through the encapsulation glass 343, the OLED polarizer 344, the capacitive fingerprint sensor film 20, and the cover plate 10 to reach the outside, and is then perceived by the user, so that the user can view the information displayed by the display module 30.

Figure 10:
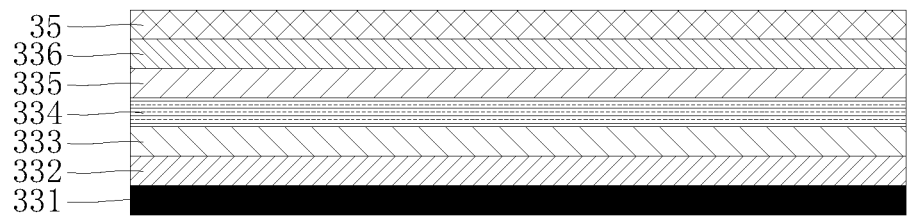
FIG. 10 to FIG. 12 are cross-sectional views of a display module according to implementations.
Figure 11:
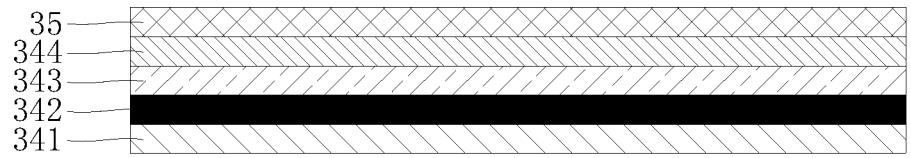
Figure 12:
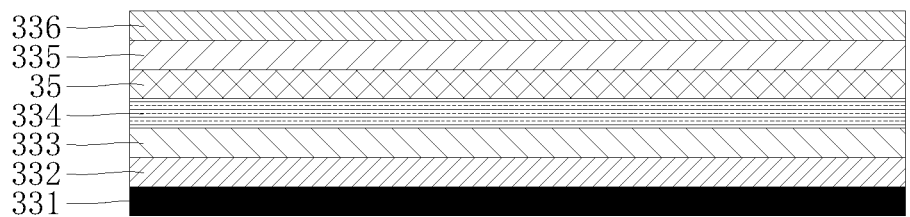

As illustrated in FIG. 10 and FIG. 11, the display module 30 may have a touch function in addition to the display function. In this case, the display module 30 further includes a touch sensor 35. In FIG. 10, the display module 30 is the LCM 33, and the backlight module 331, the lower polarizer 332, the TFT substrate 333, the liquid crystal layer 334, the color filter 335, and the upper polarizer 336 (or, a polarizer 60 described below) form the display module, and the touch sensor 35 forms the touch module. In FIG. 11, the display module 30 is the OLED display 34, and thus the glass TFT substrate 341, the OLED 342, the encapsulation glass 343, and the OLED polarizer 344 (or, the polarizer 60 described below) form the display module, and the touch sensor 35 forms the touch module. As one example, the display module may be independent of the touch module, and the two modules are integrally formed through a back-end lamination process. As another example, as illustrated in FIG. 12, the touch module may be embedded in the display module. For instance, in FIG. 12, the touch sensor 35 is disposed between the color filter 335 and the liquid crystal layer 334. For another instance, the touch sensor 35 is formed by forming elements such as a transparent electrode on a surface of the color filter 335 facing the liquid crystal layer 334. The touch sensor 35 may be a resistive touch sensor, a capacitive touch sensor, an infrared touch sensor, an acoustic wave touch sensor, an optical imaging touch sensor, an electromagnetic induction touch sensor, and the like, which are not limited herein.

Referring back to FIG. 4, the cover plate 10, the capacitive fingerprint sensor film 20, and the display module 30 are attached via the adhesive layer 40. Since the cover plate 10, the capacitive fingerprint sensor film 20, and the display module 30 are attached via the adhesive layer 40, it is possible to ensure the structural strength of the display assembly 100 and the reliability of the fingerprint recognition. When the display module 30 is the LCM 33, the cover plate 10, the capacitive fingerprint sensor film 20, and the upper polarizer 336 are attached via the adhesive layer 40. When the display module 30 is the OLED display 34, the cover plate 10, the capacitive fingerprint sensor film 20, and the OLED polarizer 344 are attached via the adhesive layer 40.

The adhesive layer 40 being used for attaching the cover plate 10 and the capacitive fingerprint sensor film 20 to the display module 30 means that the cover plate 10, the capacitive fingerprint sensor film 20, and the display module 30 are attached together via the adhesive layer 40. For example, the cover plate 10 is attached to the capacitive fingerprint sensor film 20 via the adhesive layer 40, and the capacitive fingerprint sensor film 20 is attached to the display module 30 via the adhesive layer 40. In this case, the adhesive layer 40 includes two adhesive sub-layers, the cover plate 10 being attached to the capacitive fingerprint sensor film 20 via the adhesive layer 40 refers to that the cover plate 10 is attached to the capacitive fingerprint sensor film 20 via one of the two adhesive sub-layers, and the capacitive fingerprint sensor film 20 being attached to the display module 30 via the adhesive layer 40 refers to that the capacitive fingerprint sensor film 20 is attached to the display module 30 via the other of the two adhesive sub-layers. For another example, the cover plate 10 is attached to the capacitive fingerprint sensor film 20 via the adhesive layer 40, and the cover plate 10 is attached to the display module 30 via the adhesive layer 40. In this case, the adhesive layer 40 includes two adhesive sub-layers, the cover plate 10 being attached to the capacitive fingerprint sensor film 20 via the adhesive layer 40 refers to that the cover plate 10 is attached to the capacitive fingerprint sensor film 20 via one of the two adhesive sub-layers, and the cover plate 10 being attached to the display module 30 via the adhesive layer 40 refers to that the cover plate 10 is attached to the display module 30 via the other of the two adhesive sub-layers. For yet another example, the cover plate 10 is attached to the display module 30 via the adhesive layer 40, and the capacitive fingerprint sensor film 20 is attached to the display module 30 via the adhesive layer 40. In this case, the adhesive layer 40 includes two adhesive sub-layers, the cover plate 10 being attached to the display module 30 via the adhesive layer 40 refers to that the cover plate 10 is attached to the display module 30 via one of the two adhesive sub-layers, and the capacitive fingerprint sensor film 20 being attached to the display module 30 via the adhesive layer 40 refers to that the capacitive fingerprint sensor film 20 is attached to the display module 30 via the other of the two adhesive sub-layers. For yet another example, the cover plate 10 is attached to the capacitive fingerprint sensor film 20 via the adhesive layer 40, the cover plate 10 is attached to the display module 30 via the adhesive layer 40, and the capacitive fingerprint sensor film 20 is attached to the display module 30 via the adhesive layer 40. In this case, the adhesive layer 40 includes three adhesive sub-layers, the cover plate 10 being attached to the capacitive fingerprint sensor film 20 via the adhesive layer 40 refers to that the cover plate 10 is attached to the capacitive fingerprint sensor film 20 via a first adhesive sub-layer, the cover plate 10 being attached to the display module 30 via the adhesive layer 40 refers to that the cover plate 10 is attached to the display module 30 via a second adhesive sub-layer, and the capacitive fingerprint sensor film 20 being attached to the display module 30 via the adhesive layer 40 refers to that the capacitive fingerprint sensor film 20 is attached to the display module 30 via a third adhesive sub-layer.

In one example, the adhesive layer 40 is an optical adhesive layer. In at least one implementation, the adhesive layer 40 is made from at least one of an optically clear adhesive (OCA), a PolyVinyl Butyral (PVB) film, or a Die attach film (DAF). That is, the adhesive layer 40 may be formed by an OCA, a PVB film, or a DAF.

As illustrated in FIG. 4, in at least one implementation, the adhesive layer 40 includes a first optical adhesive layer 41 and a second optical adhesive layer 42. The cover plate 10 is attached to the capacitive fingerprint sensor film 20 via the first optical adhesive layer 41. The back surface 12 of the cover plate 10 is attached to the light-exiting surface 21 of the capacitive fingerprint sensor film 20 via the first optical adhesive layer 41. The capacitive fingerprint sensor film 20 is attached to the display module 30 via the second optical adhesive layer 42. The back surface 22 of the capacitive fingerprint sensor film 20 is attached to the display surface 31 via the second optical adhesive layer 42. According to implementations, the cover plate 10, the first optical adhesive layer 41, the capacitive fingerprint sensor film 20, the second optical adhesive layer 42, and the display module 30 are sequentially stacked together in the direction opposite the light-exiting direction of the display assembly 100.

In at least one implementation, the cover plate 10 is attached to the capacitive fingerprint sensor film 20 via the first optical adhesive layer 41 in full lamination (also known as direct bonding).

The cover plate 10 and the capacitive fingerprint sensor film 20 being attached in full lamination refers to that the cover plate 10 and the capacitive fingerprint sensor film 20 are attached seamlessly. That is, the first optical adhesive layer 41 covers the whole surface of the cover plate 10 or the whole surface of the capacitive fingerprint sensor film 20, and there is no gap between the cover plate 10 and the capacitive fingerprint sensor film 20. Since the cover plate 10 is attached to the capacitive fingerprint sensor film 20 via the first optical adhesive layer 41 in full lamination, the cover plate 10 can be firmly attached to the capacitive fingerprint sensor film 20, and the position of the capacitive fingerprint sensor film 20 relative to the cover plate 10 does not vary with time, which is beneficial to improving the reliability of fingerprint recognition performed by the capacitive fingerprint sensor film 20. Furthermore, it is possible to reduce the chance that dust and moisture enter the cover plate 10 and the capacitive fingerprint sensor film 20.

In at least one implementation, the first optical adhesive layer 41 is made from at least one of an OCA, a PVB film, or a DAF. When the first optical adhesive layer 41 is made from an OCA, the first optical adhesive layer 41 is soft, the lamination process is simple, and when the cover plate 10 is pressed by the user's finger, the first optical adhesive lay 41 may have a certain buffer effect on the cover plate 10 and the capacitive fingerprint sensor film 20. When the first optical adhesive layer 41 is made from a PVB film, the first optical adhesive layer 41 has a relatively high stickiness, which is conducive to ensuring the structural stability between the cover plate 10 and the capacitive fingerprint sensor film 20. When the first optical adhesive layer 41 is made from a DAF, it is possible to reduce bubbles produced in the lamination process, and improve the lamination efficiency, thereby enhancing the flatness of the coupling between the cover plate 10 and the capacitive fingerprint sensor film 20.

When the first optical adhesive layer 41 is made from at least one of an OCA, a PVB film, or a DAF, a thickness of the first optical adhesive layer 41 ranges from 0.05 mm to 0.15 mm. That is, the thickness of the first optical adhesive layer 41 is any value between 0.05 mm and 0.15 mm. For example, the thickness of the first optical adhesive layer 41 is 0.05 mm, 0.06 mm, 0.07 mm, 0.08 mm, 0.09 mm, 0.10 mm, 0.11 mm, 0.12 mm, 0.13 mm, 0.14 mm, 0.15 mm, or the like. For another example, the thickness of the first optical adhesive layer 41 is 0.1 mm, which is beneficial to ensuring the stability of the coupling between the cover plate 10 and the capacitive fingerprint sensor film 20, and reducing the thickness of the electronic device 1000.

In at least one implementation, the capacitive fingerprint sensor film 20 is attached to the display module 30 via the second optical adhesive layer 42 in full lamination or in edge lamination (also known as air bonding).

The capacitive fingerprint sensor film 20 and the display module 30 being attached in full lamination refers to that the capacitive fingerprint sensor film 20 and the display module 30 are attached seamlessly. That is, the second optical adhesive layer 42 covers the whole surface of the capacitive fingerprint sensor film 20 or the whole surface of the display module 30, and there is no gap between the capacitive fingerprint sensor film 20 and the display module 30. Since the capacitive fingerprint sensor film 20 is attached to the display module 30 via the second optical adhesive layer 42 in full lamination, the capacitive fingerprint sensor film 20 can be firmly attached to the display module 30, and the position of the display module 30 relative to the capacitive fingerprint sensor film 20 does not vary with time, which is beneficial to enhancing the structural consistency between a display region and a fingerprint recognition region. Furthermore, it is possible to reduce the chance that dust and moisture enter the capacitive fingerprint sensor film 20 and the display module 30.

Figure 13:
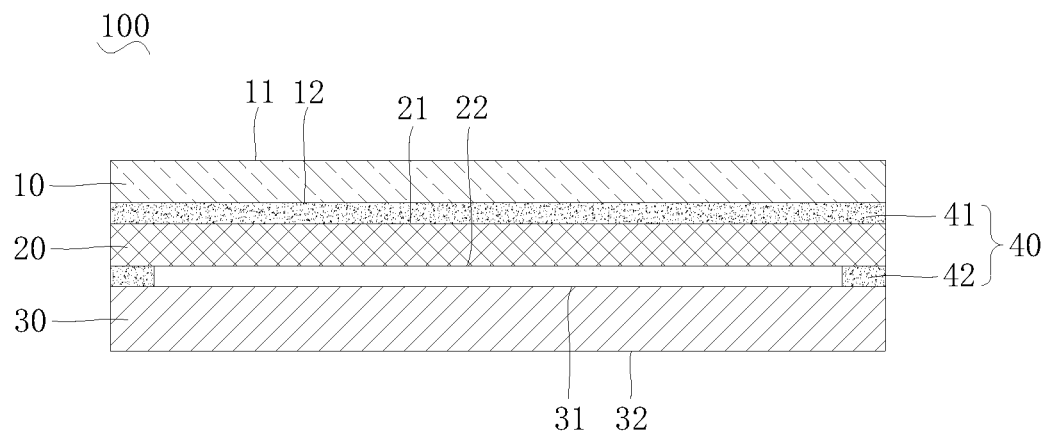
FIG. 13 to FIG. 18 are cross-sectional views of a display assembly according to other implementations.

As illustrated in FIG. 13, the capacitive fingerprint sensor film 20 and the display module 30 being attached in edge lamination refers to that a side or an edge of the capacitive fingerprint sensor film 20 is attached to a side or an edge of the display module 30 via the second optical adhesive layer 42. That is, the second optical adhesive layer 42 is coated on the periphery of the capacitive fingerprint sensor film 20 or the display module 30 (e.g., around the capacitive fingerprint sensor film 20 or the display module 30), and there is a gap between the capacitive fingerprint sensor film 20 and the display module 30. It should be noted that the gap can be filled with some transparent materials (such as PET chipper than optical adhesive), so as to enhance the structural stability and reduce the possibility that dust and moisture enter the capacitive fingerprint sensor film 20 and the display module 30. When the capacitive fingerprint sensor film 20 is attached to the display module 30 via the second optical adhesive layer 42 in edge lamination, the second optical adhesive layer 42 is relatively small in size, and thus cost is reduced and the lamination efficiency is improved. In addition, if the capacitive fingerprint sensor film 20 is damaged, the capacitive fingerprint sensor film 20 can be easily detached from the display module 30 and replaced with another capacitive fingerprint sensor film, and thus there is no need to replace both the capacitive fingerprint sensor film 20 and the display module 30. On the other hand, if the display module 30 is damaged, the display module 30 can be easily detached from the capacitive fingerprint sensor film 20 and replaced with another display module, and thus there is no need to replace both the capacitive fingerprint sensor film 20 and the display module 30.

In at least one implementation, the second optical adhesive layer 42 is made from at least one of an OCA, a PVB film, or a DAF. As one example, when the second optical adhesive layer 42 is made from an OCA, the second optical adhesive layer 42 is soft, the lamination process is simple, and when the cover plate 10 is pressed by the user's finger, the second optical adhesive layer 42 can reduce impact on the capacitive fingerprint sensor film 20 and the display module 30. As another example, when the second optical adhesive layer 42 is made from a PVB film, the second optical adhesive layer 42 has a relatively high stickiness, which is conducive to ensuring the structural stability between the capacitive fingerprint sensor film 20 and the display module 30. As yet another example, when the second optical adhesive layer 42 is made from a DAF, it is possible to reduce bubbles produced in the lamination process, and improve the lamination efficiency, thereby enhancing the flatness of the coupling between the capacitive fingerprint sensor film 20 and the display module 30.

When the second optical adhesive layer 42 is made from at least one of an OCA, a PVB film, or a DAF, a thickness of the second optical adhesive layer 42 ranges from 0.05 mm to 0.15 mm. That is, the thickness of the second optical adhesive layer 42 is any value between 0.05 mm and 0.15 mm. For example, the thickness of the second optical adhesive layer 42 is 0.05 mm, 0.06 mm, 0.07 mm, 0.08 mm, 0.09 mm, 0.10 mm, 0.11 mm, 0.12 mm, 0.13 mm, 0.14 mm, 0.15 mm, or the like. For another example, the thickness of the second optical adhesive layer 42 is 0.1 mm, and thus not only the stability of the coupling between the capacitive fingerprint sensor film 20 and the display module 30 can be ensured, but also the electronic device 1000 can be made to be relatively thin.

It should be noted that the first optical adhesive layer 41 and the second optical adhesive layer 42 can be made from a same material or different materials. For example, when the first optical adhesive layer 41 and the second optical adhesive layer 42 are made from the same material, both the first optical adhesive layer 41 and the second optical adhesive layer 42 may be made from an OCA, a PVB film, or a DAF. For another example, when the first optical adhesive layer 41 and the second optical adhesive layer 42 are made from different materials, the first optical adhesive layer 41 is made from an OCA, and the second optical adhesive layer 42 is made from a PVB film; or the first optical adhesive layer 41 is made from a PVB film, and the second optical adhesive layer 42 is made from a DAF; or the first optical adhesive layer 41 is made from a DAF, and the second optical adhesive layer 42 is made from an OCA, which are not enumerated herein. In addition, the thickness of the first optical adhesive layer 41 and the thickness of the second optical adhesive layer 42 may be the same or different. For example, if the thickness of the first optical adhesive layer 41 is the same as that of the second optical adhesive layer 42, the thickness of the first optical adhesive layer 41 and the thickness of the second optical adhesive layer 42 are both 0.09 mm, 0.1 mm, or 0.11 mm. For another example, if the thickness of the first optical adhesive layer 41 is different from that of the second optical adhesive layer 42, the thickness of the first optical adhesive layer 41 is 0.09 mm, and the thickness of the second optical adhesive layer 42 is 1 mm; or the thickness of the first optical adhesive layer 41 is 0.1 mm, and the thickness of the second optical adhesive layer 42 is 0.11 mm; or the thickness of the first optical adhesive layer 41 is 0.11 mm, and the thickness of the second optical adhesive layer 42 is 0.1 mm, which are not enumerated herein.

Figure 14:
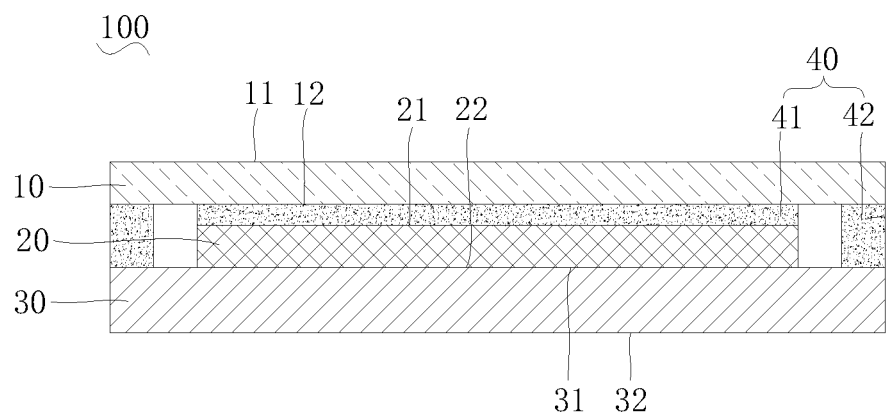

As illustrated in FIG. 14, in at least one implementation, the adhesive layer 41 includes a first optical adhesive layer 41 and a second optical adhesive layer 42. The cover plate 10 is attached to the capacitive fingerprint sensor film 20 via the first optical adhesive layer 41. The back surface 12 of the cover plate 10 is attached to the light-exiting surface 21 of the capacitive fingerprint sensor film 20 via the first optical adhesive layer 41. The cover plate 10 is attached to the display module 30 via the second optical adhesive layer 42. The back surface 12 of the cover plate 10 is attached to the display surface 31 via the second optical adhesive layer 42. According to implementations, in a central region of the cover plate 10, the cover plate 10, the first optical adhesive layer 41, the capacitive fingerprint sensor film 20, and the display module 30 are sequentially stacked together in the direction opposite the light-exiting direction of the display assembly 100. In the edge region of the cover plate 10, the cover plate 10, the second optical adhesive layer 42, and the display module 30 are sequentially stacked together in the direction opposite the light-exiting direction of the display assembly 100.

Similar to foregoing implementations, the cover plate 10 is attached to the capacitive fingerprint sensor film 20 via the first optical adhesive layer 41 in full lamination. The first optical adhesive layer 41 is made from at least one of an OCA, a PVB film, or a DAF. When the first optical adhesive layer 41 is made from an OCA, a PVB film, or a DAF, a thickness of the first optical adhesive layer 41 ranges from 0.05 mm to 0.15 mm, which are not described in detail herein.

In at least one implementation, the cover plate 10 is attached to the display module 30 via the second optical adhesive layer 42 in edge lamination.

Figure 15:
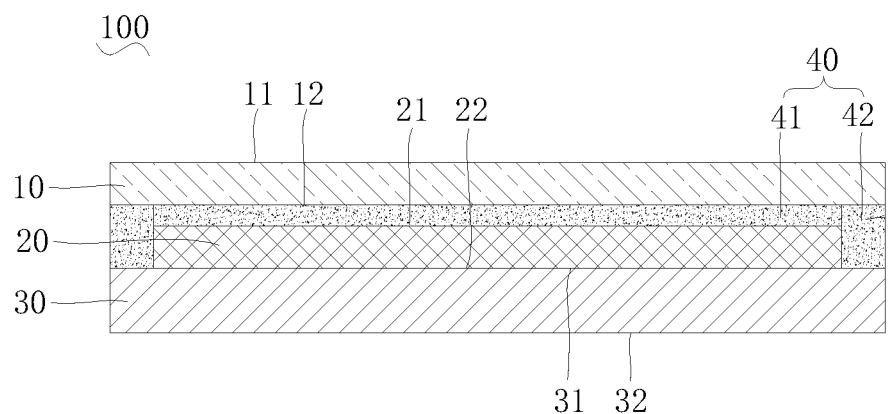

The cover plate 10 and the display module 30 being attached in edge lamination refers to that a side or an edge of the cover plate 10 is attached to a side or an edge of the display module 30 via the second optical adhesive layer 42. That is, the second optical adhesive layer 42 is coated on the periphery of the cover plate 10 or the display module 30 (around the cover plate 10 or the display module 30), and there is an gap between the cover plate 10 and the display module 30 (as illustrated in FIG. 14). It should be noted that the gap may be filled with some transparent materials (such as PET chipper than optical adhesive), so as to enhance structural stability and reduce the possibility that dust and moisture enter the cover plate 10 and the display module 30. Alternatively, the gap can also be formed on the periphery of the second optical adhesive layer 42 instead of being formed between the second optical adhesive layer 42 and the first optical adhesive layer 41 as illustrated in FIG. 14. In this case, electronic elements or circuit wires can be disposed in the gap to improve space utilization. Alternatively, since the first optical adhesive layer 41 and the capacitive fingerprint sensor film 20 are disposed between the cover plate 10 and the display module 30, the first optical adhesive layer 41 and the capacitive fingerprint sensor film 20 just fill the gap between the cover plate 10 and the display module 30, such that there is no gap between the cover plate 10 and the display module 30 (as illustrated in FIG. 15). As such, when the cover plate 10 is attached to the display module 30 via the second optical adhesive layer 42 in edge lamination, the second optical adhesive layer 42 is relatively small in size, and thus cost is reduced and the lamination efficiency is improved. In addition, the thickness of the second optical adhesive layer 42 may be equal to or approximately equal to a sum of thicknesses of the first optical adhesive layer 41 and the capacitive fingerprint sensor film 20. Compared with a scenario in which the cover plate 10 is attached to the capacitive fingerprint sensor film 20 via the first optical adhesive layer 41 and the capacitive fingerprint sensor film 20 is attached to the display module 30 via the second optical adhesive layer 42 (as illustrated in FIG. 4), in FIG. 14, the thickness of the display assembly 100 is equal to a sum of thicknesses of the cover plate 10, the first optical adhesive layer 41, the capacitive fingerprint sensor film 20, and the display module 30, that is, the second adhesive layer 42 does not make a contribution to the thickness of the display assembly 100, and thus the thickness of the display assembly 100 is reduced and the electronic device 1000 is relatively thin. Furthermore, if the cover plate 10 is damaged, the cover plate 10 can be easily detached from the display module 30 and replaced with another cover plate, and thus there is no need to replace both the cover plate 10 and the display module 30. Alternatively, if the display module 30 is damaged, the display module 30 can be easily detached from the cover plate 10 and replaced with another display module, and thus there is no need to replace both the display module 30 and the cover plate 10.

Similar to the implementations illustrated in FIG. 4, the second optical adhesive layer 42 is made from at least one of an OCA, a PVB film, or a DAF. When the second optical adhesive layer 42 is made from an OCA, a PVB film, or a DAF, a thickness of the second optical adhesive layer 42 ranges from 0.05 mm to 0.15 mm. The first optical adhesive layer 41 and the second optical adhesive layer 42 can be made from a same material or different materials.

Figure 16:
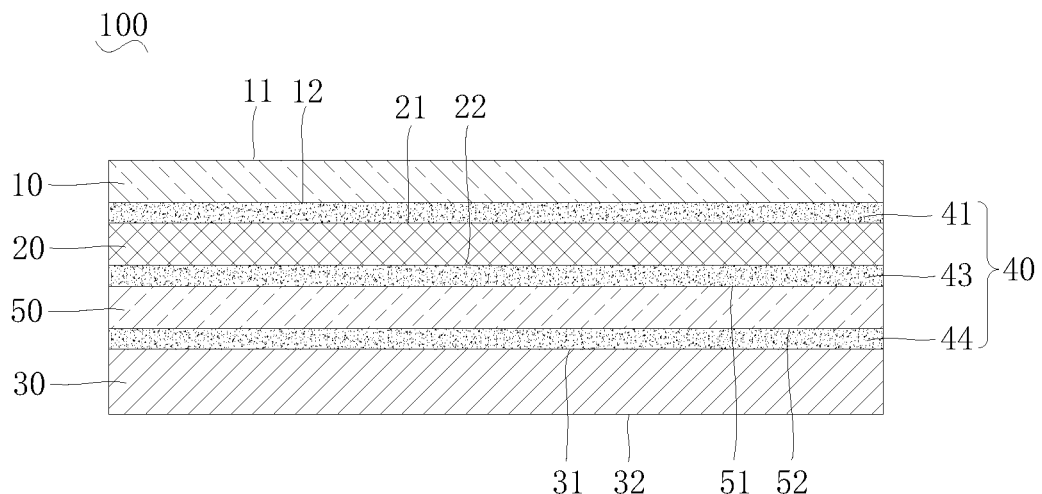

As illustrated in FIG. 16, the display assembly 100 further includes a reinforcing layer 50. The reinforcing layer 50 is disposed between the capacitive fingerprint sensor film 20 and the display module 30. Specifically, the reinforcing layer 50 is disposed between the back surface 22 of the capacitive fingerprint sensor film 20 and display surface 31. In one example, the reinforcing layer 50 has a light-exiting surface 51 and a back surface 52 opposite the light-exiting surface 51. The light-exiting surface 51 of the reinforcing layer 50 faces the back surface 22 of the capacitive fingerprint sensor film 20. The back surface 52 of the reinforcing layer 50 faces the display surfaces 31.

The reinforcing layer 50 and the cover plate 10 form a double-layer cover plate. When the thickness of the cover plate 10 is only 0.3 mm or less than 0.3 mm, the reinforcing layer 50 can enhance the strength of the display assembly 100, and reduce the chance that the capacitive fingerprint sensor film 20 cannot work normally due to collision or impact during use of the electronic device 1000.

The reinforcing layer 50 can be made of at least one of Sapphire, glass, or a composite board, or made from at least one of PI or PET. For the explanation of sapphire, glass, PI, PET, and the composite board, reference may be made to the foregoing implementations, which are not described in detail herein. When the reinforcing layer 50 is made of at least one of Sapphire, glass, or a composite board, or made from at least one of PI or PET, a thickness of the reinforcing layer 50 ranges from 0.1 mm to 0.5 mm. That is, the thickness of the reinforcing layer 50 is any value between 0.1 mm and 0.5 mm. For example, the thickness of the reinforcing layer 50 is 0.1 mm, 0.14 mm, 0.18 mm, 0.22 mm, 0.26 mm, 0.3 mm, 0.34 mm, 0.38 mm, 0.42 mm, 0.46 mm, 0.5 mm, or the like.

When the display assembly 100 includes the reinforcing layer 50, the cover plate 10, the capacitive fingerprint sensor film 20, the reinforcing layer 50, and the display module 30 are attached via the adhesive layer 40. The adhesive layer 40 being used for attaching the cover plate 10, the capacitive fingerprint sensor film 20, and the reinforcing layer 50 to the display module 30 means that the cover plate 10, the capacitive fingerprint sensor film 20, the reinforcing layer 50, and the display module 30 are attached together via the adhesive layer 40. For example, the cover plate 10 is attached to the capacitive fingerprint sensor film 20 via the adhesive layer 40, the capacitive fingerprint sensor film 20 is attached to the reinforcing layer 50 via the adhesive layer 40, and the reinforcing layer 50 is attached to the display module 30 via the adhesive layer 40. In this case, the adhesive layer 40 includes three adhesive sub-layers. The cover plate 10 being attached to the capacitive fingerprint sensor film 20 via the adhesive layer 40 refers to that the cover plate 10 is attached to the capacitive fingerprint sensor film 20 via a first adhesive sub-layer. The capacitive fingerprint sensor film 20 being attached to the reinforcing layer 50 via the adhesive layer 40 refers to that the capacitive fingerprint sensor film 20 is attached to the reinforcing layer 50 via a second adhesive sub-layer. The reinforcing layer 50 being attached to the display module 30 via the adhesive layer 40 refers to that the reinforcing layer 50 is attached to the display module 30 via a third adhesive sub-layer. For another example, the cover plate 10 is attached to the capacitive fingerprint sensor film 20 via the adhesive layer 40, the capacitive fingerprint sensor film 20 is attached to the reinforcing layer 50 via the adhesive layer 40, and the capacitive fingerprint sensor film 20 is attached to the display module 30 via the adhesive layer 40. In this case, the adhesive layer 40 includes three adhesive sub-layers. The cover plate 10 being attached to the capacitive fingerprint sensor film 20 via the adhesive layer 40 refers to that the cover plate 10 is attached to the capacitive fingerprint sensor film 20 via a first adhesive sub-layer. The capacitive fingerprint sensor film 20 being attached to the reinforcing layer 50 via the adhesive layer 40 refers to that the capacitive fingerprint sensor film 20 is attached to the reinforcing layer 50 a second adhesive sub-layer. The capacitive fingerprint sensor film 20 being attached to the display module 30 via the adhesive layer 40 refers to that the capacitive fingerprint sensor film 20 is attached to the display module 30 via a third adhesive sub-layer. For yet another example, the cover plate 10 is attached to the capacitive fingerprint sensor film 20 via the adhesive layer 40, the capacitive fingerprint sensor film 20 is attached to the display module 30 via the adhesive layer 40, and the reinforcing layer 50 is attached to the display module 30 via the adhesive layer 40. In this case, the adhesive layer 40 includes three adhesive sub-layers. The cover plate 10 being attached to the capacitive fingerprint sensor film 20 via the adhesive layer 40 refers to that the cover plate 10 is attached to the capacitive fingerprint sensor film 20 via a first adhesive sub-layer. The capacitive fingerprint sensor film 20 being attached to the display module 30 via the adhesive layer 40 refers to that the capacitive fingerprint sensor film 20 is attached to the display module 30 via a second adhesive sub-layer. The reinforcing layer 50 being attached to the display module 30 via the adhesive layer 40 refers to that the reinforcing layer 50 is attached to the display module 30 via a third adhesive sub-layer. For yet another example, the cover plate 10 is attached to the capacitive fingerprint sensor film 20 via the adhesive layer 40, the capacitive fingerprint sensor film 20 is attached to the reinforcing layer 50 via the adhesive layer 40, the capacitive fingerprint sensor film 20 is attached to the display module 30 via the adhesive layer 40, and the reinforcing layer 50 is attached to the display module 30 via the adhesive layer 40. In this case, the adhesive layer 40 includes four adhesive sub-layers. The cover plate 10 being attached to the capacitive fingerprint sensor film 20 via the adhesive layer 40 refers to that the cover plate 10 is attached to the capacitive fingerprint sensor film 20 via a first adhesive sub-layer. The capacitive fingerprint sensor film 20 being attached to the reinforcing layer 50 via the adhesive layer 40 refers to that the capacitive fingerprint sensor film 20 is attached to the reinforcing layer 50 via a second adhesive sub-layer. The capacitive fingerprint sensor film 20 being attached to the display module 30 via the adhesive layer 40 refers to that the capacitive fingerprint sensor film 20 is attached to the display module 30 via a third adhesive sub-layer. The reinforcing layer 50 being attached to the display module 30 via the adhesive layer 40 refers to that the reinforcing layer 50 is attached to the display module 30 via a fourth adhesive sub-layer. The disclosure is not limited thereto.

As illustrated in FIG. 16, in at least one implementation, the adhesive layer 40 includes the first optical adhesive layer 41, a third optical adhesive layer 43, and a fourth optical adhesive layer 44. The cover plate 10 is attached to the capacitive fingerprint sensor film 20 via the first optical adhesive layer 41. The back surface 12 of the cover plate 10 is attached to the light-exiting surface 21 of the capacitive fingerprint sensor film 20 via the first optical adhesive layer 41. The capacitive fingerprint sensor film 20 is attached to the reinforcing layer 50 via the third optical adhesive layer 43. The back surface 22 of the capacitive fingerprint sensor film 20 is attached to the light-exiting surface 51 of the reinforcing layer 50 via the third optical adhesive layer 43. The reinforcing layer 50 is attached to the display module 30 via the fourth optical adhesive layer 44. The back surface 52 of the reinforcing layer 50 is attached to the display surface 31 via the fourth optical adhesive layer 44. According to implementations, the cover plate 10, the first optical adhesive layer 41, the capacitive fingerprint sensor film 20, the third optical adhesive layer 43, the reinforcing layer 50, the fourth optical adhesive layer 44, and the display module 30 are sequentially stacked together in the direction opposite the light-exiting direction of the display assembly 100. That is, the second optical adhesive layer 42 described in the foregoing implementations is replaced by the third optical adhesive layer 43 and the fourth optical adhesive layer 44, and furthermore the reinforcing layer 50 is sandwiched between the capacitive fingerprint sensor film 20 and the display module 30.

The capacitive fingerprint sensor film 20 is attached to the reinforcing layer 50 via the third optical adhesive layer 43 in full lamination or in edge lamination.

As illustrated in FIG. 16, the capacitive fingerprint sensor film 20 and the reinforcing layer 50 being attached in full lamination refers to that the capacitive fingerprint sensor film 20 and the reinforcing layer 50 are attached seamlessly. That is, the first optical adhesive layer 41 covers the whole surface of the capacitive fingerprint sensor film 20 or the whole surface of the reinforcing layer 50, and there is no gap between the capacitive fingerprint sensor film 20 and the reinforcing layer 50. When the capacitive fingerprint sensor film 20 is attached to the reinforcing layer 50 via the third optical adhesive layer 43 in full lamination, the capacitive fingerprint sensor film 20 can be firmly attached to the reinforcing layer 50, and the reinforcing layer 50 has a high reinforcement effect. Furthermore, it is possible to reduce the chance that dust and moisture from enter the capacitive fingerprint sensor film 20 and the reinforcing layer 50.

Figure 17:
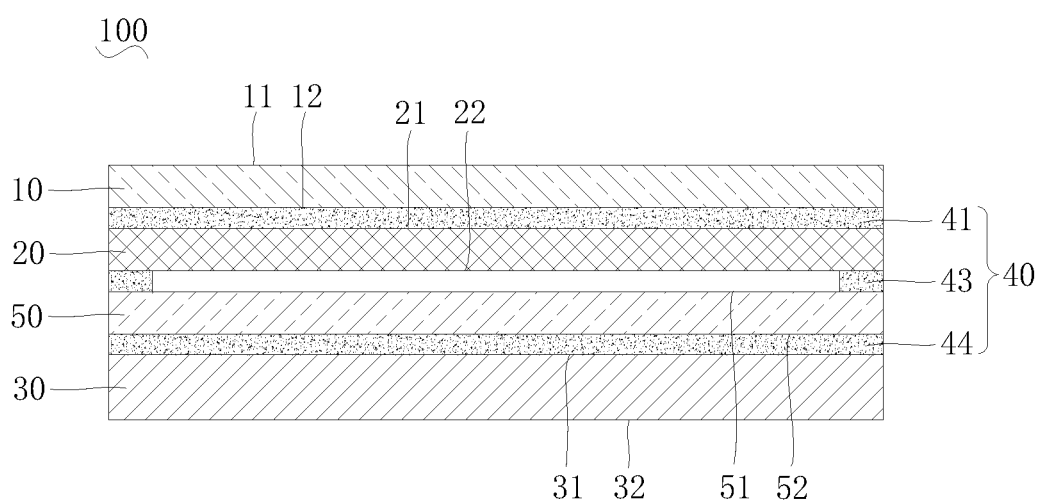

As illustrated in FIG. 17, the capacitive fingerprint sensor film 20 and the reinforcing layer 50 being attached in edge lamination refers to that a side or an edge of the capacitive fingerprint sensor film 20 is attached to a side or an edge of the reinforcing layer 50 via the third optical adhesive layer 43. That is, the third optical adhesive layer 43 is coated on the periphery of the capacitive fingerprint sensor film 20 or the reinforcing layer 50 (around the capacitive fingerprint sensor film 20 or the reinforcing layer 50), and there is a gap between the capacitive fingerprint sensor film 20 and the reinforcing layer 50. It should be noted that, the gap may be filled with some transparent materials (such as PET chipper than optical adhesive), so as to enhance structural stability and reduce the possibility that dust and moisture enter the capacitive fingerprint sensor film 20 and the reinforcing layer 50. Furthermore, when the capacitive fingerprint sensor film 20 is attached to the reinforcing layer 50 via the third optical adhesive layer 43 in edge lamination, the third optical adhesive layer 43 is relatively small in size, and thus cost is reduced, and the lamination efficiency is improved.

The third optical adhesive layer 43 is made from at least one of an OCA, a PVB film, or a DAF. As one example, when the third optical adhesive layer 43 is made from an OCA, the third optical adhesive layer 43 is soft, and the lamination process is simple. In addition, when the cover plate 10 is pressed by the user's finger, the third optical adhesive layer 43 can reduce impact on the capacitive fingerprint sensor film 20. As another example, when the third optical adhesive layer 43 is made from a PVB film, the third optical adhesive layer 43 has a relatively high stickiness, which is conducive to ensuring the structural stability between the capacitive fingerprint sensor film 20 and the reinforcing layer 50. As yet another example, when the third optical adhesive layer 43 is made from a DAF, it is possible to reduce bubbles produced in the lamination process and improve the lamination efficiency, thereby enhancing the flatness of the coupling between the capacitive fingerprint sensor film 20 and the reinforcing layer 50.

When the third optical adhesive layer 43 is made from at least one of an OCA, a PVB film, or a DAF, a thickness of the third optical adhesive layer 43 rangers from 0.05 mm to 0.15 mm. That is, the thickness of the third optical adhesive layer 43 is any value between 0.05 mm and 0.15 mm. For example, the thickness of the third optical adhesive layer 43 is 0.05 mm, 0.06 mm, 0.07 mm, 0.08 mm, 0.09 mm, 0.10 mm, 0.11 mm, 0.12 mm, 0.13 mm, 0.14 mm, 0.15 mm, or the like. For another example, the thickness of the third optical adhesive layer 43 is 0.1 mm, and thus not only the stability of the coupling between the capacitive fingerprint sensor film 20 and the reinforcing layer 50 can be ensured, but also the electronic device 1000 can be made to be relatively thin.

Similarly, the reinforcing layer 50 is attached to the display module 30 via the fourth optical adhesive layer 44 in full lamination or in edge lamination.

As illustrated in FIG. 16, the reinforcing layer 50 and the display module 30 being attached in full lamination refers to that the reinforcing layer 50 and the display module 30 are attached seamlessly. That is, the fourth optical adhesive layer 44 covers the whole surface of the reinforcing layer 50 or the whole surface of the display module 30, and there is no gap between the reinforcing layer 50 and the display module 30. When the reinforcing layer 50 is attached to the display module 30 via the fourth optical adhesive layer 44 in full lamination, the reinforcing layer 50 can be firmly attached to the display module 30, and the reinforcing layer 50 has a high reinforcement effect. Furthermore, it is possible to reduce the chance that dust and moisture enter the reinforcing layer 50 and the display module 30.

Figure 18:
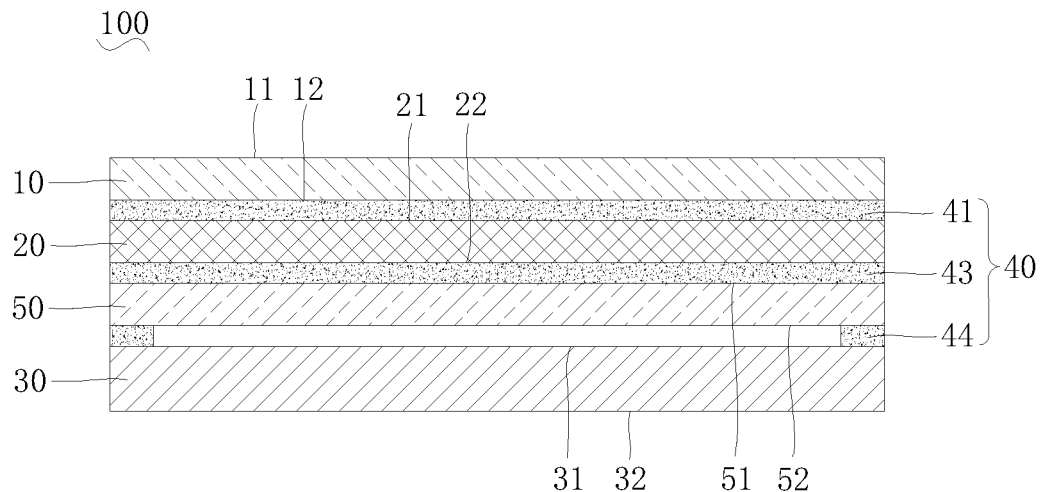

As illustrated in FIG. 18, the reinforcing layer 50 and the display module 30 being attached in edge lamination refers to that a side or an edge of the reinforcing layer 50 is attached to a side or an edge of the display module 30 via the fourth optical adhesive layer 44. That is, the fourth optical adhesive layer 44 is coated on the periphery of the reinforcing layer 50 or the display module 30 (around the reinforcing layer 50 or the display module 30), and there is a gap between the reinforcing layer 50 and the display module 30. In one example, the gap may be filled with some transparent materials (such as PET chipper than optical adhesive), so as to enhance structural stability and reduce the possibility that dust and moisture enter the reinforcing layer 50 and the display module 30. When the reinforcing layer 50 is attached to the display module 30 via the fourth optical adhesive layer 44 in edge lamination, the fourth optical adhesive layer 44 is relatively small in size, and thus cost is reduced and the lamination efficiency is improved.

The fourth optical adhesive layer 44 is made from at least one of an OCA, a PVB film, or a DAF. As one example, when the fourth optical adhesive layer 44 is made from an OCA, the fourth optical adhesive layer 44 is soft, and the lamination process is simple. In addition, when the cover plate 10 is pressed by the user's finger, the fourth optical adhesive layer 44 can reduce impact on the display module 30. As another example, when the fourth optical adhesive layer 44 is made from a PVB film, the fourth optical adhesive layer 44 has a relatively high stickiness, which is conducive to ensuring the structural stability between the reinforcing layer 50 and the display module 30. As yet another example, when the fourth optical adhesive layer 44 is made from a DAF, it is possible to reduce bubbles produced in the lamination process and improve the lamination efficiency, thereby enhancing the flatness of the coupling between the reinforcing layer 50 and the display module 30.

When the fourth optical adhesive layer 44 is made from at least one of an OCA, a PVB film, or a DAF, a thickness of the fourth optical adhesive layer 44 rangers from 0.05 mm to 0.15 mm. That is, the thickness of the fourth optical adhesive layer 44 is any value between 0.05 mm and 0.15 mm. For example, the thickness of the fourth optical adhesive layer 44 is 0.05 mm, 0.06 mm, 0.07 mm, 0.08 mm, 0.09 mm, 0.10 mm, 0.11 mm, 0.12 mm, 0.13 mm, 0.14 mm, 0.15 mm, or the like. For another example, the thickness of the fourth optical adhesive layer 44 is 0.1 mm, and thus not only the stability of the coupling between the reinforcing layer 50 and the display module 30 can be ensured, but also the electronic device 1000 can be made to be relatively thin.

Figure 19:
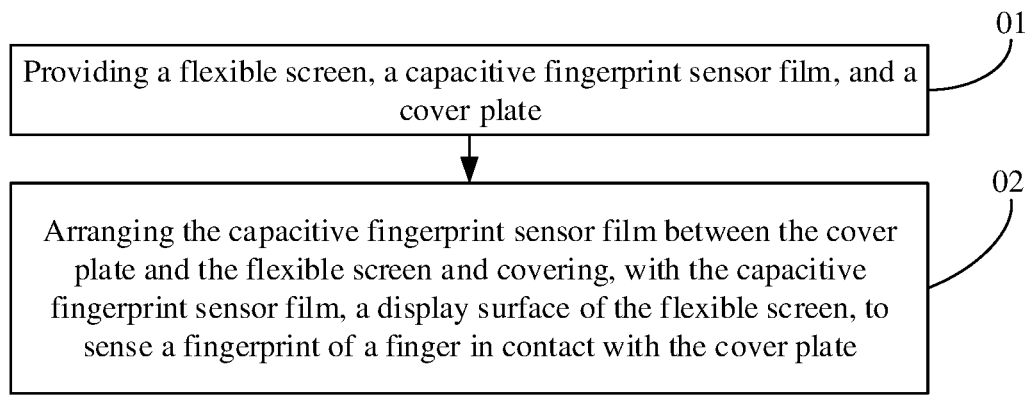
FIG. 19 to FIG. 23 are schematic flow charts illustrating a method for assembling a display assembly according to implementations.

As illustrated in FIG. 19, a method for assembling the display assembly 100 is provided. The method begins at block 01.

At block 01, the display module 30, the capacitive fingerprint sensor film 20, and the cover plate 10 are provided.

At block 02, the capacitive fingerprint sensor film 20 is disposed between the cover plate 10 and the display module 30, and the capacitive fingerprint sensor film 20 covers a display surface 31 of the display module 30, so as to sense a fingerprint of a finger in contact with the cover plate 10.

It should be noted that for the explanation of the display assembly 100 in the method, reference may be made to the foregoing implementations, and will not be repeated herein.

In the method for assembling the display assembly 100, the capacitive fingerprint sensor film 20 covers the display surfaces 31, such that a full-screen fingerprint recognition function can be achieved. Compared with the local fingerprint recognition, the operation is convenient. In addition, compared with optical fingerprint recognition, when the capacitive fingerprint sensor film 20 is used for fingerprint recognition, a relatively large camera is not needed, and only the capacitive fingerprint sensor film 20 is needed, such that the electronic device 1000 is thin, and design of the electronic device 1000 is simple.

Figure 20:
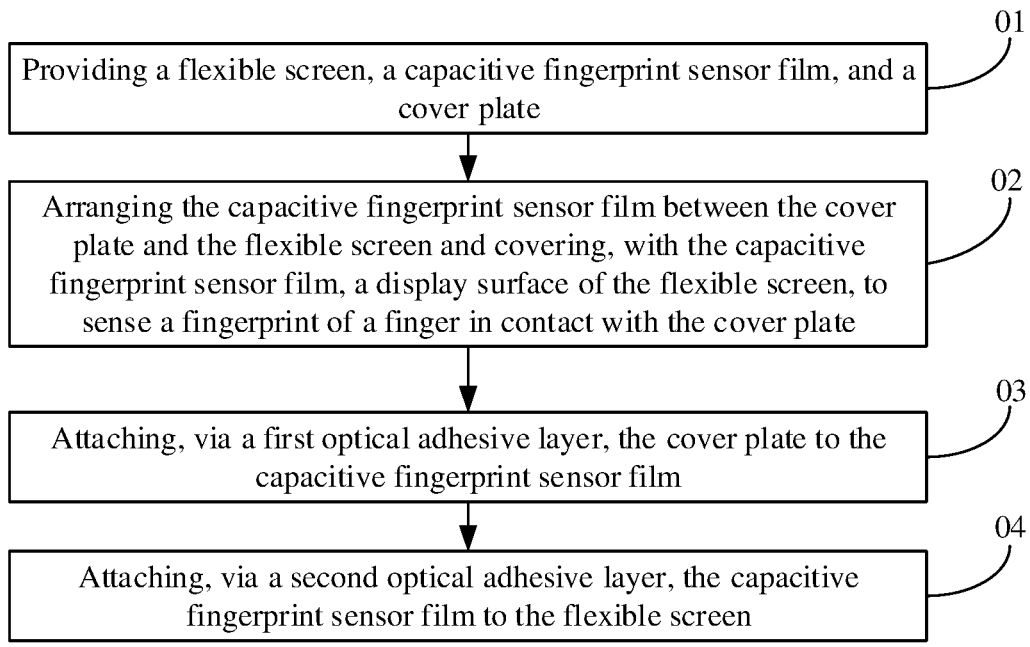

As illustrated in FIG. 20, the method further includes the following.

At block 03, the cover plate 10 is attached to the capacitive fingerprint sensor film 20 via the first optical adhesive layer 41.

At block 04, the capacitive fingerprint sensor film 20 is attached to the display module 30 via the second optical adhesive layer 42.

During assembling of the display assembly 100, for operations at block 03, the first optical adhesive layer 41 is coated on a back surface 12 of the cover plate 10 or a light-exiting surface 21 of the capacitive fingerprint sensor film 20, and then the cover plate 10 is attached to the capacitive fingerprint sensor film 20 via the first optical adhesive layer 41. For operations at block 04, the second optical adhesive layer 42 is coated on a back surface 22 of the capacitive fingerprint sensor film 20 or the display surface 31, and then the capacitive fingerprint sensor film 20 is attached to the display module 30 via the second optical adhesive layer 42. In one example, the operations at block 03 can be performed before the operations at block 04, or the operations at block 04 can be performed before the operation at block 03, or the operations at block 03 and 04 can be performed simultaneously. In this way, the display assembly 100 obtained is as illustrated in FIG. 4 or FIG. 13. In addition, the cover plate 10 is attached to the capacitive fingerprint sensor film 20 via the first optical adhesive layer 41 in full lamination, and the capacitive fingerprint sensor film 20 is attached to the display module 30 via the second optical adhesive layer 42 in full lamination or in edge lamination, which are not described in detail herein.

Figure 21:
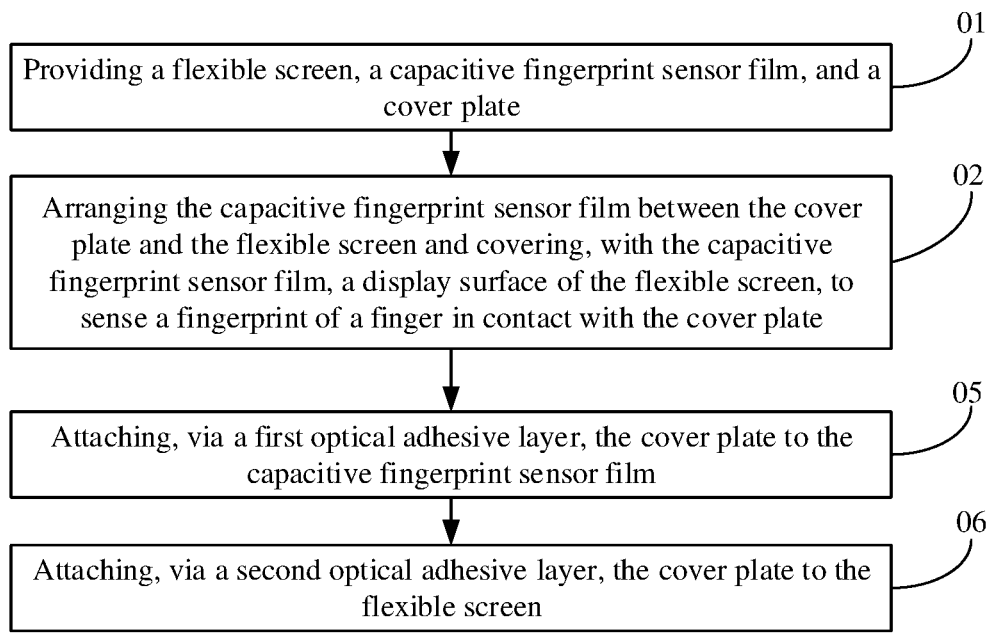

As illustrated in FIG. 21, the method further includes the following.

At block 05, the cover plate 10 is attached to the capacitive fingerprint sensor film 20 via a first optical adhesive layer 41.

At block 06, the cover plate 10 is attached to the display module 30 via a second optical adhesive layer 42.

During assembling of the display assembly 100, for operations at block 05, the first optical adhesive layer 41 is coated on a back surface 12 of the cover plate 10 or a light-exiting surface 21 of the capacitive fingerprint sensor film 20, and then the cover plate 10 is attached to the capacitive fingerprint sensor film 20 via the first optical adhesive layer 41. For operations at block 06, the second optical adhesive layer 42 is coated on a back surface 12 of the cover plate 10 or the display surface 31, and then the cover plate 10 is attached to the display module 30 via the second optical adhesive layer 42. In this way, the display assembly 100 obtained is as illustrated in FIG. 14 or FIG. 15. In addition, the cover plate 10 is attached to the capacitive fingerprint sensor film 20 via the first optical adhesive layer 41 in full lamination, and the cover plate 10 is attached to the display module 30 via the second optical adhesive layer 42 in edge lamination, which are not described in detail herein.

It should be noted that during assembling of the display assembly 100, there are other coating and lamination manners, as long as the cover plate 10, the capacitive fingerprint sensor film 20, and the display module 30 are attached via the adhesive layer 40, and the display module 30, the capacitive fingerprint sensor film 20, and the cover plate 10 are sequentially stacked together in a light-exiting direction of the display assembly 100.

After the assembling of the display assembly 100 is completed, the display assembly 100 is coupled with the front casing 210 in a glue dispensing or adhesive manner. A circuit board (for example, a sensor chip 201 and a display chip 301 described below) of the display assembly 100 communicates with a main board (for example, a main board chip 220 described below) of the electronic device 1000 to implement a display function and a fingerprint recognition function of the display assembly 100.

Figure 22:
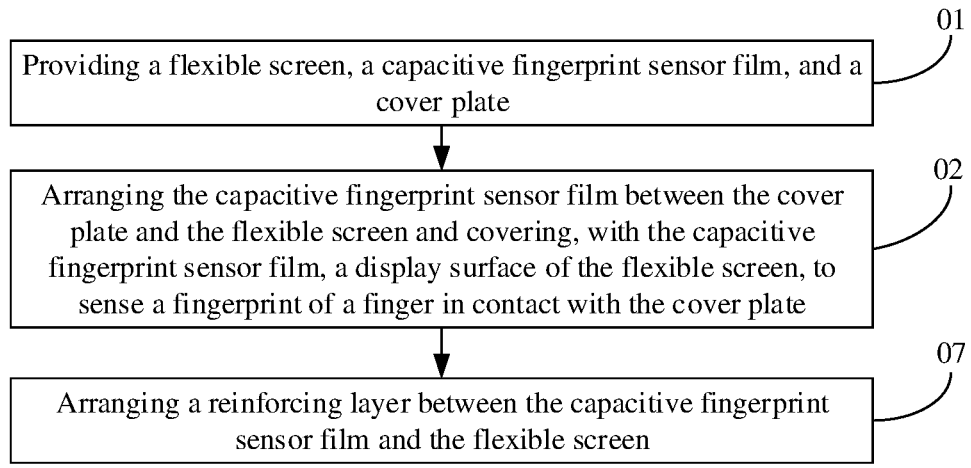

As illustrated in FIG. 22, the display assembly 100 further includes a reinforcing layer 50, and the method further includes the following.

At block 07, the reinforcing layer 50 is arranged between the capacitive fingerprint sensor film 20 and the display module 30.

Figure 23:
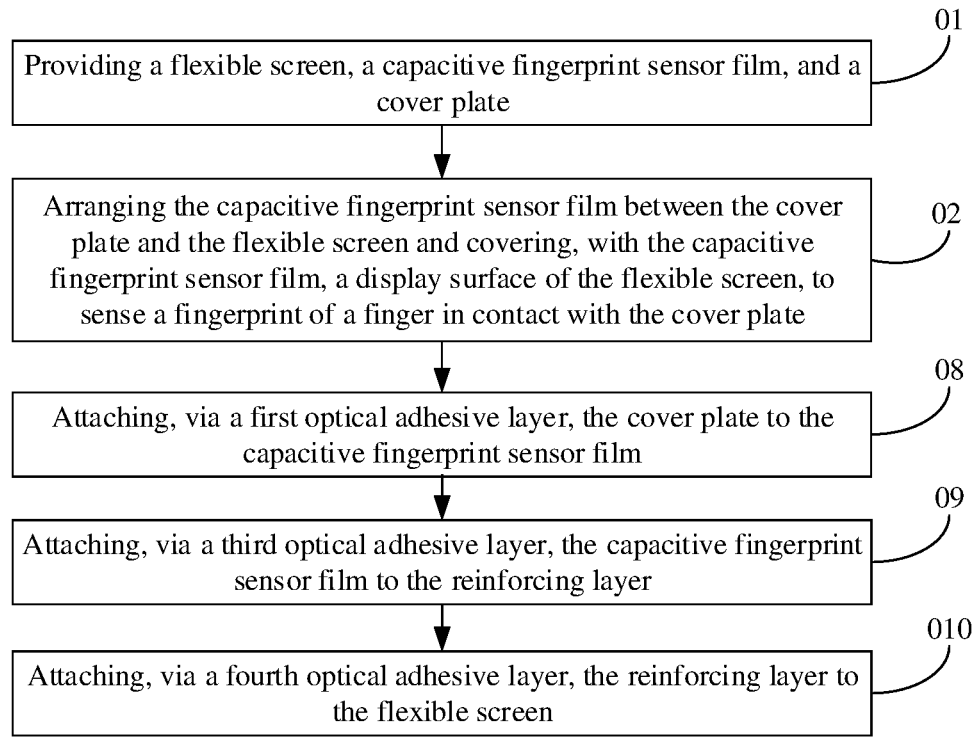

As illustrated in FIG. 23, in at least one implementation, the method further includes the following.

At block 08, the cover plate 10 is attached to the capacitive fingerprint sensor film 20 via a first optical adhesive layer 41.

At block 09, the capacitive fingerprint sensor film 20 is attached to the reinforcing layer 50 via a third optical adhesive layer 43.

At block 010, the reinforcing layer 50 is attached to the display module 30 via a fourth optical adhesive layer 44.

During assembling of the display assembly 100, for operations at block 08, the first optical adhesive layer 41 is coated on a back surface 12 of the cover plate 10 or a light-exiting surface 21 of the capacitive fingerprint sensor film 20, and then the cover plate 10 is attached to the capacitive fingerprint sensor film 20 via the first optical adhesive layer 41. For operations at block 09, the third optical adhesive layer 43 is coated on a back surface 22 of the capacitive fingerprint sensor film 20 or a light-exiting surface 51 of the reinforcing layer 50, and then the capacitive fingerprint sensor film 20 is attached to the reinforcing layer 50 via the third optical adhesive layer 43. For operations at block 010, the fourth optical adhesive layer 44 is coated on a back surface 52 of the reinforcing layer 50 or the display surface 31, and then the reinforcing layer 50 is attached to the display module 30 via the fourth optical adhesive layer 44. The operations at block 08, 09, and 010 can be performed in any order. For example, the operations at block 08, 09, and 010 can be performed sequentially, or the operations at block 08 and 09 can be performed simultaneously and then the operations at block 010 may be performed, which are not enumerated herein. In this way, the display assembly 100 obtained may be as illustrated in FIG. 16, FIG. 17, or FIG. 18. In addition, the capacitive fingerprint sensor film 20 is attached to the reinforcing layer 50 via the third optical adhesive layer 43 in full lamination or in edge lamination, and the reinforcing layer 50 is attached to the display module 30 via the fourth optical adhesive layer 44 in full lamination or in edge lamination, which are not described in detail herein.

It should be noted that during assembling of the display assembly 100, there are other coating and lamination manners, as long as the cover plate 10, the capacitive fingerprint sensor film 20, the reinforcing layer 50, and the display module 30 are attached via the adhesive layer 40, and the display module 30, the reinforcing layer 50, the capacitive fingerprint sensor film 20, and the cover plate 10 are sequentially stacked together in the light-exiting direction of the display assembly 100.

Figure 24:
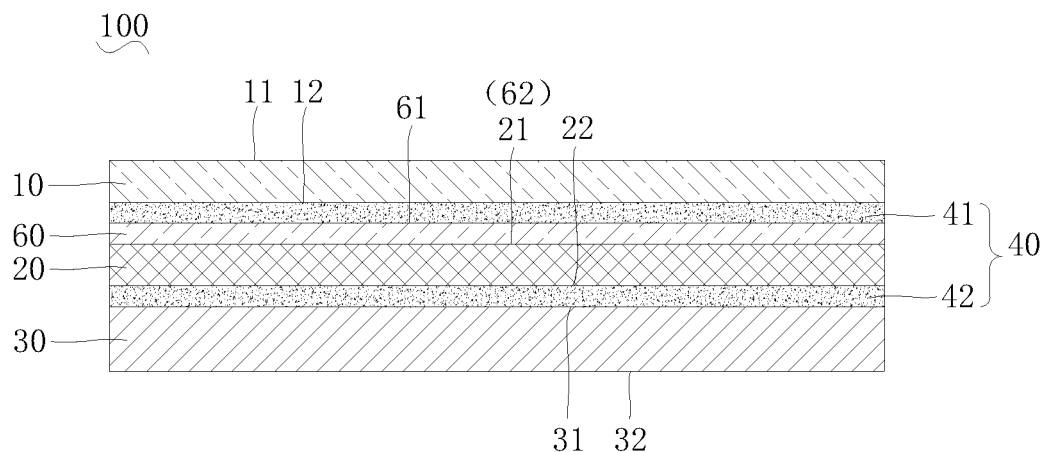
FIG. 24 is a cross-sectional view of a display assembly according to other implementations.

As illustrated in FIG. 24, in one example, the display assembly 100 further includes a polarizer 60. The polarizer 60 is attached to the cover plate 10 (the back surface 12 of the cover plate 10) via the adhesive layer 40. The polarizer 60 is arranged between the cover plate 10 and the capacitive fingerprint sensor film 20. Specifically, the polarizer 60 is arranged between the back surface 12 of the cover plate 10 and the light-exiting surface 21 of the capacitive fingerprint sensor film 20. The polarizer 60 has a light-exiting surface 61 and a back surface 62 opposite the light-exiting surface 61. The light-exiting surface 61 of the polarizer 60 faces the back surface 12 of the cover plate 10, and the back surface 62 of the polarizer 60 faces the light-exiting surface 21 of the capacitive fingerprint sensor film 20.

In one example, a thickness of the polarizer 60 ranges from 100 μm to 150 μm. That is, the thickness of the polarizer 60 is any value between 100 μm and 150 μm. For example, the thickness of the polarizer 60 is 100 μm, 105 μm, 110 μm, 115 μm, 120 μm, 125 μm, 130 μm, 135 μm, 140 μm, 145 μm, 150 μm, or the like.

The polarizer 60 is an optical thin film composed of multilayer polymer materials and can generate polarized light. The polarizer 60 can convert natural light without polarization into polarized light, to allow light perpendicular to the electric field to pass through the capacitive fingerprint sensor film 20, so as to control passage of light. When the polarizer 60 is disposed between the cover plate 10 and the capacitive fingerprint sensor film 20, it is possible to reduce ambient lights incident from the cover plate 10 to the capacitive fingerprint sensor film 20, so as to alleviate a phenomenon that the appearance of the display assembly 100 presents an abnormal color at a certain angle (for example, the appearance is earthy yellow) due to that the ambient lights are reflected by metal grid wires of the capacitive fingerprint sensor film 20.

Figure 25:
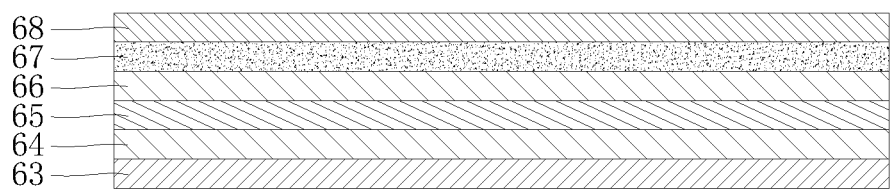
FIG. 25 is a cross-sectional view of a polarizer according to implementations.

As illustrated in FIG. 25, the polarizer 60 may be a circular polarizer. The polarizer 60 includes a protection film 63, a triacetyl cellulose (TAC) functional film 64, a polyvinyl alcohol (PVA) film 65, a light plate TAC film 66, a pressure-sensitive adhesive layer 67, and a release film 68 that are stacked together in the light-existing direction of the display assembly 100. Some processes may be applied to the surface of the TAC functional film 64 to achieve corresponding additional functions. For example, the surface of the TAC functional film 64 may be subjected to antiglare treatment (AG), antiglare and low reflection treatment (AG+LR), transparent hardening and low reflection treatment (CHC+LR), transparent hardening treatment (CHC), antireflection treatment (AR), or the like. Different treatment manners may enable the electronic device 1000 to meet different application requirements. According to implementations, the antireflection treatment is applied to the surface of the TAC functional film 64, such that the TAC functional film 64 has an antireflection function (that is, with the interference effect, reflected lights on the front and back surfaces of the TAC functional film 64 are eliminated mutually to reduce reflection), and thus reflected lights generated by the capacitive fingerprint sensor film 20 may be reduced. Furthermore, the phenomenon that the appearance of the display assembly 100 presents earthy yellow at a certain angle due to that the ambient lights are reflected by the metal grid wires of the capacitive fingerprint sensor film 20 can be alleviated.

Since the polarizer 60 can decrease the brightness of the display module 30, a polarizer in the display module 30 can be removed.

Figure 26:
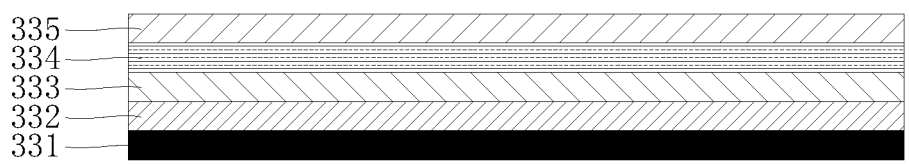
FIG. 26 is a cross-sectional view of a LCM according to other implementations.

As one example, when the display module 30 is the LCM 33, the LCM 33 includes a backlight module 331, a lower polarizer 332, a TFT substrate 333, a liquid crystal layer 334, a color filter 335, and an upper polarizer 336 that are disposed in the light-exiting direction of the display assembly 100 (as illustrated in FIG. 8), and therefore the upper polarizer 336 may be removed (canceled) under a condition that display assembly 100 includes the polarizer 60. In this case, the LCM 33 only includes the backlight module 331, the lower polarizer 332, the TFT substrate 333, the liquid crystal layer 334, and the color filter 335 that are stacked together in the light-exiting direction of the display assembly 100 (as illustrated in FIG. 26), and the polarizer 60 can be used as the upper polarizer 336 in the LCM 33.

Figure 27:
FIG. 27 is a cross-sectional view of an OLED display according to other implementations.

As another example, when the display module 30 is the OLED display 34, the OLED display 34 includes a glass TFT substrate 341, an OLED 342, a encapsulation glass 343, and an OLED polarizer 344 that are disposed in the light-exiting direction of the display assembly 100 (as illustrated in FIG. 9), and therefore the OLED polarizer 344 can be removed under a condition that display assembly 100 includes the polarizer 60. In this case, the OLED display 34 only includes the glass TFT substrate 341, the OLED 342, and the encapsulation glass 343 that are stacked together in the light-exiting direction of the display assembly 100 (as illustrated in FIG. 27), and the polarizer 60 can be used as the OLED polarizer in the OLED display 34.

Alternatively, since the polarizer of the display module 30 only causes a relatively small reduction in the brightness of the display module 30, there is no need to remove the polarizer of the display module 30. Therefore, the display module 30 illustrated in FIG. 8 and FIG. 9 can also be adopted.

When the display assembly 100 includes the polarizer 60, the cover plate 10, the polarizer 60, the capacitive fingerprint sensor film 20, and the display module 30 are attached via the adhesive layer 40.

As illustrated in FIG. 24, as one example, when the adhesive layer 40 includes the first optical adhesive layer 41 and the second optical adhesive layer 42, the cover plate 10 and the polarizer 60 (for example, the back surface 12 of the cover plate 10 and a light-exiting surface 61 of the polarizer 60) are attached via the first optical adhesive layer 41, and the capacitive fingerprint sensor film 20 and the display module 30 (for example, the back surface 22 of the capacitive fingerprint sensor film 20 and the display surface 31) are attached via the second optical adhesive layer 42. According to implementations, the cover plate 10, the first optical adhesive layer 41, the polarizer 60, the capacitive fingerprint sensor film 20, the second optical adhesive layer 42, and the display module 30 are sequentially stacked together in the direction opposite the light-exiting direction of the display assembly 100. In one example, the cover plate 10 is attached to the polarizer 60 via the first optical adhesive layer 41 in full lamination. The capacitive fingerprint sensor film 20 is attached to the display module 30 via the second optical adhesive layer 42 in full lamination or in edge lamination.

Figure 28:
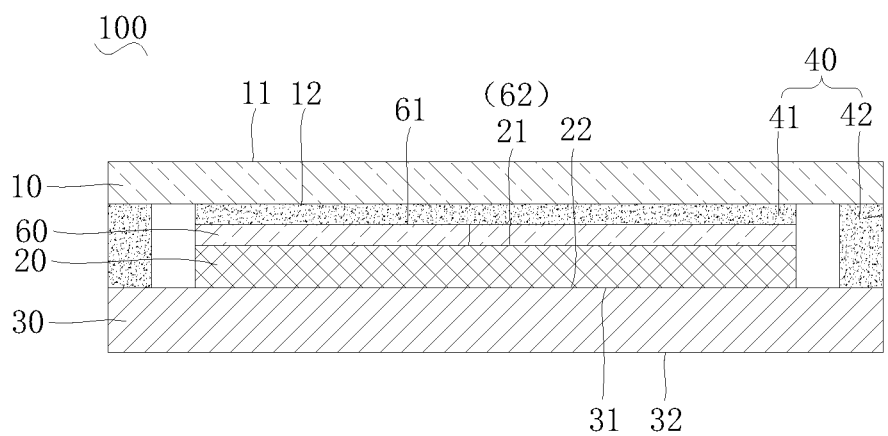
FIG. 28 to FIG. 31 are cross-sectional view of a display assembly according to other implementations.

As illustrated in FIG. 28, as another example, when the adhesive layer 40 includes the first optical adhesive layer 41 and the second optical adhesive layer 42, the cover plate 10 and the polarizer 60 (for example, the back surface 12 of the cover plate 10 and a light-exiting surface 61 of the polarizer 60) are attached via the first optical adhesive layer 41, and the cover plate 10 and the display module 30 (for example, the back surface 12 of the cover plate 10 and the display surface 31) are attached via the second optical adhesive layer 42. According to implementations, in the central region of the cover plate 10, the cover plate 10, the first optical adhesive layer 41, the polarizer 60, the capacitive fingerprint sensor film 20, and the display module 30 are sequentially stacked together in the direction opposite the light-exiting direction of the display assembly 100. In the edge region of the cover plate 10, the cover plate 10, the second optical adhesive layer 42, and the display module 30 are sequentially stacked together in the direction opposite the light-exiting direction of the display assembly 100. In one example, the cover plate 10 is attached to the polarizer 60 via the first optical adhesive layer 41 in full lamination. The cover plate 10 is attached to the display module 30 via the second optical adhesive layer 42 in edge lamination.

Figure 29:
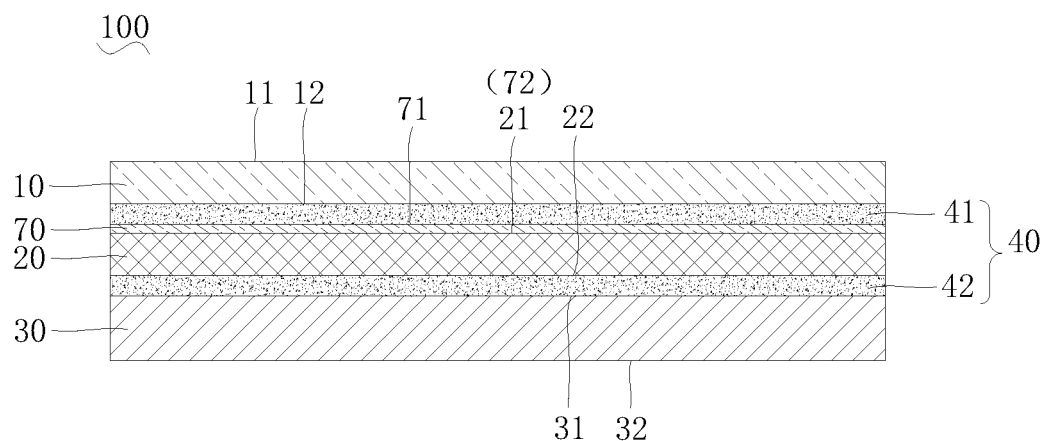

As illustrated in FIG. 29, in one example, the display assembly 100 may further include an antireflection film 70. The antireflection film 70 is disposed between the cover plate 10 and the capacitive fingerprint sensor film 20. Specifically, the antireflection film 70 is disposed between the back surface 12 of the cover plate 10 and the light-exiting surface 21 of the capacitive fingerprint sensor film 20. The antireflection film 70 has a light-exiting surface 71 and a back surface 72 opposite the light-exiting surface 71. The light-exiting surface 71 of the antireflection film 70 faces the back surface 12 of the cover plate 10. The back surface 72 of the antireflection film 70 faces the light-exiting surface 21 of the capacitive fingerprint sensor film 20.

The thickness of the antireflection film 70 ranges from 200 nm to 300 nm. That is, the thickness of the antireflection film 70 may be any value between 200 nm and 300 nm. For example, the thickness of the antireflection film 70 is 200 nm, 210 nm, 220 nm, 230 nm, 240 nm, 250 nm, 260 nm, 270 nm, 280 nm, 290 nm, 300 nm, or the like.

The antireflection film 70 is also known as an antireflection film, an antireflection and transmission film, or an anti-reflectance (AR) film, and so on. The antireflection film 70 is formed by forming a multi-layer composite optical film on a substrate in a sputtering process, where for the sputtering process a low refractive index (L) material and a high refractive index (H) material are alternatively adopted to form a film stack, layers and a thickness of the film stack are controlled, and reflection of the surface of the substrate may be reduced with interference effects. According to implementations, the substrate may be the cover plate 10 or the capacitive fingerprint sensor film 20.

Figure 30:
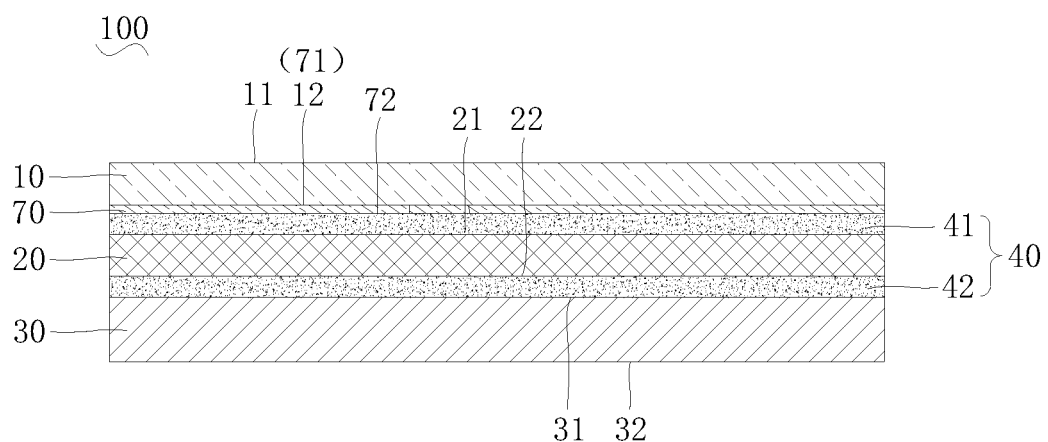

Specifically, the antireflection film 70 may be formed on the back surface 12 of the cover plate 10 (as illustrated in FIG. 30), or formed on the light-exiting surface 21 of the capacitive fingerprint sensor film 20 (as illustrated in FIG. 29). By means of arranging the antireflection film 70 on the back surface 12 of the cover plate 10 or the light-exiting surface 21 of the capacitive fingerprint sensor film 20, it is possible to reduce reflected lights generated by the capacitive fingerprint sensor film 20, alleviate the phenomenon that the side of the display module 30 presents earthy yellow due to that the lights are reflected by the metal grid wires of the capacitive fingerprint sensor film 20, and improve the appearance. In addition, it is possible to play the role of anti-glare, and thus even strong light exists, the user can clearly view the image displayed by the display module 30.

It should be noted that compared with the structures of the display assembly 100 illustrated in FIG. 3 to FIG. 6, and FIG. 13 to FIG. 18, in the display assembly 100 illustrated in FIG. 29 and FIG. 30, only the antireflection film 70 is provided on the back surface 12 of the cover plate 10 or the light-exiting surface 21 of the capacitive fingerprint sensor film 20, and other structures may be the same as that illustrated in FIG. 3 to FIG. 6 and FIG. 13 to FIG. 18. After the antireflection film 70 is provided, other structures illustrated in FIG. 3 to FIG. 6 and FIG. 13 to FIG. 18 may be changed accordingly. For example, the cover plate 10, the antireflection film 70, the capacitive fingerprint sensor film 20, and the display module 30 are attached via the adhesive layer 40. When the adhesive layer 40 includes the first optical adhesive layer 41 and the second optical adhesive layer 42, the antireflection film 70 and the capacitive fingerprint sensor film 20 are attached via the first optical adhesive layer 41 (as illustrated in FIG. 30), and the cover plate 10 and the antireflection film 70 are attached via the first optical adhesive layer 41 (as illustrated in FIG. 29), which are not described in detail herein.

Figure 31:
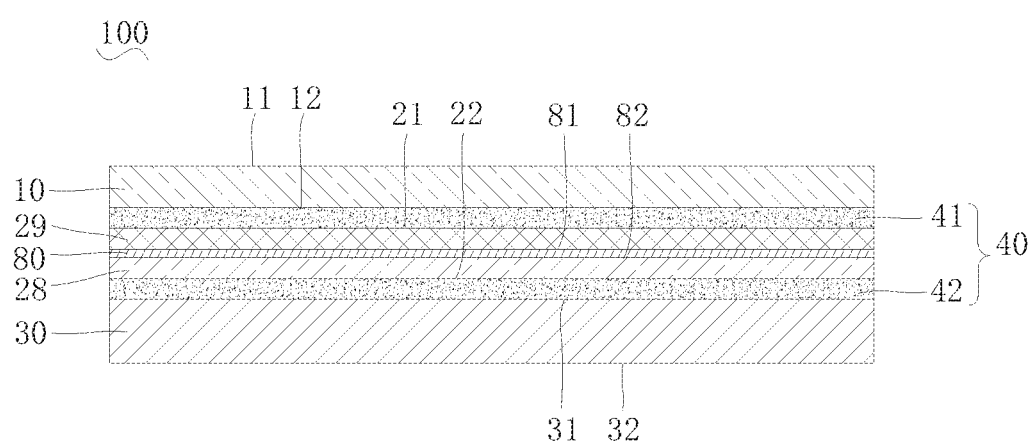
Figure 32:
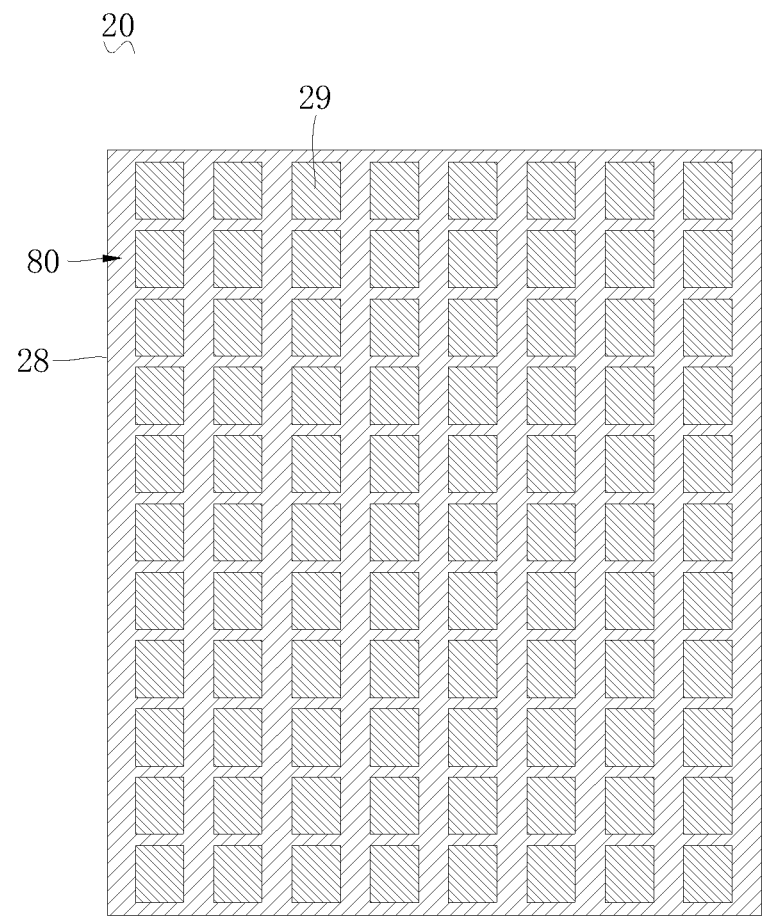
FIG. 32 is a schematic structural view of a capacitive fingerprint sensor film according to other implementations.

As illustrated in FIG. 4 and FIG. 31, in one example, the display assembly 100 further includes a high impedance film 80. The capacitive fingerprint sensor film 20 includes a sensor substrate 28 and a sensor circuit layer 29 (i.e., the metal grid wires described above) that are disposed in the light-exiting direction of the display assembly 100. The sensor circuit layer 29 is disposed on the sensor substrate 28. The sensor circuit layer 29 is configured to detect capacitance values to obtain a fingerprint image when fingerprint recognition is performed. The high impedance film 80 is disposed between the sensor circuit layer 29 and the sensor substrate 28. As illustrated in FIG. 32, the high impedance film 80 defines a through hole, so that the sensor circuit layer 29 passes through the through hole to be formed on the sensor substrate 28. The high impedance film 80 has a light-exiting surface 81 and a back surface 82 opposite the light-exiting surface 81. The light-exiting surface 81 of the high impedance film 80 faces the sensor circuit layer 29. The back surface 82 of the high impedance film 80 faces the sensor substrate 28.

The thickness of the high impedance film 80 ranges from 20 nm to 60 nm. That is, the thickness of the high impedance film 80 is any value between 20 nm and 60 nm. For example, the thickness of the high impedance film 80 is 20 nm, 24 nm, 28 nm, 32 nm, 36 nm, 40 nm, 44 nm, 48 nm, 52 nm, 56 nm, 60 nm, or the like.

The high impedance film 80 is composed of graphite oxide, stannic oxide, and a mixture of surfactant and cross-linking agent. The high impedance film 80 is disposed between the sensor circuit layer 29 and the sensor substrate 28, which can avoid or reduce mutual interference between the capacitive fingerprint sensor film 20 and the display module 30, thereby avoiding that functions of the capacitive fingerprint sensor film 20 and the display module 30 are affected due to the mutual interference between the capacitive fingerprint sensor film 20 and the display module 30.

It should be noted that compared with the structure of the display assembly 100 illustrated in FIG. 3 to FIG. 6 and FIG. 13 to FIG. 18, in the display assembly 100 illustrated in FIG. 31 and FIG. 32, the high impedance film 80 is provided between the sensor circuit layer 29 and the sensor substrate 28, and other structures are the same as those in FIG. 3 to FIG. 6 and FIG. 13 to FIG. 18, which will not be explained herein.

In addition, the capacitive fingerprint sensor film 20 in FIG. 32 and the capacitive fingerprint sensor film 20 in FIG. 7 may have a same or corresponding structure, or may have two different structures. When the capacitive fingerprint sensor film 20 in FIG. 32 and the capacitive fingerprint sensor film 20 in FIG. 7 have the same or corresponding structure, the sensor substrate 28 may be equivalent to the sensor board 24, and the sensor circuit layer 29 may be equivalent to the pixel sensors 23, the pixel amplifiers 25, and the output circuits 26. Alternatively, when the capacitive fingerprint sensor film 20 in FIG. 7 further includes a semiconductor substrate, the sensor substrate 28 may be equivalent to the semiconductor substrate, and the sensor circuit layer 29 may be equivalent to the pixel sensors 23, the sensor board 24, the pixel amplifiers 25, and the output circuits 26. It should be noted that there is no need to provide the pixel amplifier 25 for the capacitive fingerprint sensor film 20, which is not limited herein.

As illustrated in FIG. 4 and FIG. 10, in one example, in addition to the fingerprint recognition function, the capacitive fingerprint sensor film 20 can be used as a touch sensor 35 of the display module 30 to implement a touch function. That is, there is no need to arrange an additional touch sensor 35 for the display module 30 (the structure of the display module 30 is as illustrated in FIG. 8 and FIG. 9). The dual functions (that is, fingerprint recognition function and touch function) can be realized with the capacitive fingerprint sensor film 20. With such configuration, the display assembly 100 is simple in structure, thin, high in integration, low in cost, and good in light transmittance. Furthermore, it is possible to reduce the number of connecting terminals and volume of the display assembly 100, such that the design is simple.

The fingerprint recognition function and touch function of the capacitive fingerprint sensor film 20 may be implemented in a time division multiplexing manner. That is, when the capacitive fingerprint sensor film 20 is configured to implement the fingerprint recognition function, the capacitive fingerprint sensor film 20 does not implement the touch function (that is, the touch function is disabled). When the capacitive fingerprint sensor film 20 is configured to implement the touch function, the capacitive fingerprint sensor film 20 does not implement the fingerprint recognition function (that is, the fingerprint recognition function is disabled).

As one example, when the capacitive fingerprint sensor film 20 is configured to implement fingerprint recognition function, the capacitive fingerprint sensor film 20 detects capacitance values of multiple touch points. Since the finger has an uneven surface, that is, a finger has concave points (i.e., valleys of a fingerprint of the finger) and convex points (i.e., ridges of the fingerprint), the capacitance values corresponding to the ridges and valleys may be different. Therefore, according to the capacitance values of different touch points, whether the touch point is in contact with a concave point or a convex point of the finger can be determined, such that a fingerprint image may be obtained, and therefore, according to the fingerprint image, fingerprint recognition can be performed.

As another example, when the capacitive fingerprint sensor film 20 is configured to implement the touch function, the capacitive fingerprint sensor film 20 detects capacitance values of multiple touch points. Since a capacitance value of a touch point in case that the finger is pressed on the cover plate 10 is not the same as that of the touch point in case that the finger is not pressed on the cover plate 10, whether the touch point is pressed can be determined according to change in the capacitance value corresponding to the touch point. According to change in the capacitance value corresponding to each of the multiple touch points, determine whether the touch point is pressed, and thus coordinates of touch points which are pressed by the user's finger and a press trajectory may be determined, such that the electronic device 1000 may be controlled to implement the touch function in response to the press operation (the coordinates of touch points and the press trajectory) of the user's finger.

As illustrated in FIG. 3, the display assembly 100 further includes a sensor chip 201. The sensor chip 201 is coupled with the capacitive fingerprint sensor film 20. The sensor chip 201 is configured to read capacitance values detected by the capacitive fingerprint sensor film 20, and to form a fingerprint image for fingerprint recognition according to the capacitance values, thereby implementing a fingerprint recognition function. Alternatively, the sensor chip 201 is configured to read capacitance values detected by the capacitive fingerprint sensor film 20, and determine the coordinates of the touch points and the press trajectory according to the capacitance values, thereby implementing the touch function.

After the sensor chip 201 reads the capacitance values detected by the capacitive fingerprint sensor film 20, whether the capacitance values are used for the fingerprint recognition function or the touch function may be determined according to application scenarios of the electronic device 1000. For example, when the electronic device 1000 is applicable to an encryption scenario, an unlocking scenario, a payment scenario, and the like, the sensor chip 201 reads the capacitance values detected by the capacitive fingerprint sensor film 20, and implements a fingerprint recognition function according to the capacitance values detected. For another example, when the electronic device 1000 is applicable to a scenario other than the above scenarios, the sensor chip 201 reads the capacitance values detected by the capacitive fingerprint sensor film 20, and implements a touch function according to the capacitance values detected.

It should be noted that the electronic device 1000 may further provide other judgment logics to determine whether the capacitive fingerprint sensor film 20 and the sensor chip 201 are used to implement a fingerprint recognition function or a touch function, which is not limited herein.

As illustrated in FIG. 1 and FIG. 3, in one example, the electronic device 1000 further includes a main board chip 220. The display assembly 100 further includes a sensor chip 201 and a display chip 301. The sensor chip 201 is coupled with the capacitive fingerprint sensor film 20, and the display chip 301 is coupled with the display module 30. The sensor chip 201 and the display chip 301 are respectively coupled with the main board chip 220, where the sensor chip 201 is coupled with the main board chip 220 to implement the fingerprint recognition function, and the display chip 301 is coupled with the main board chip 220 to implement the display function.

Figure 33:
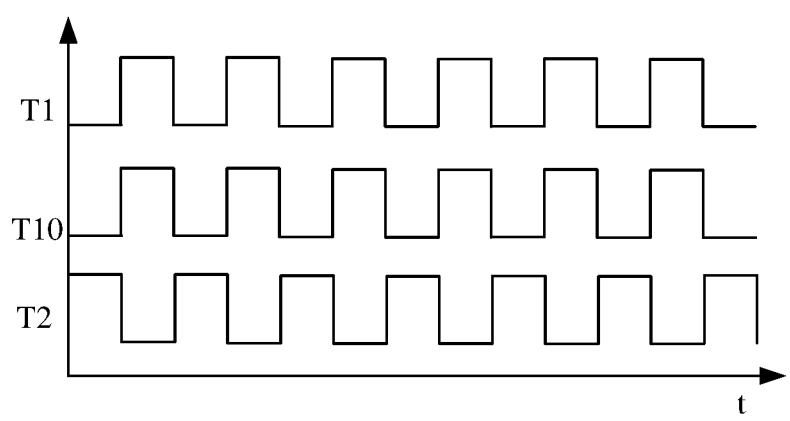
FIG. 33 to FIG. 35 are schematic diagrams illustrating working states of the capacitive fingerprint sensor film and a display module of according to implementations.
Figure 34:
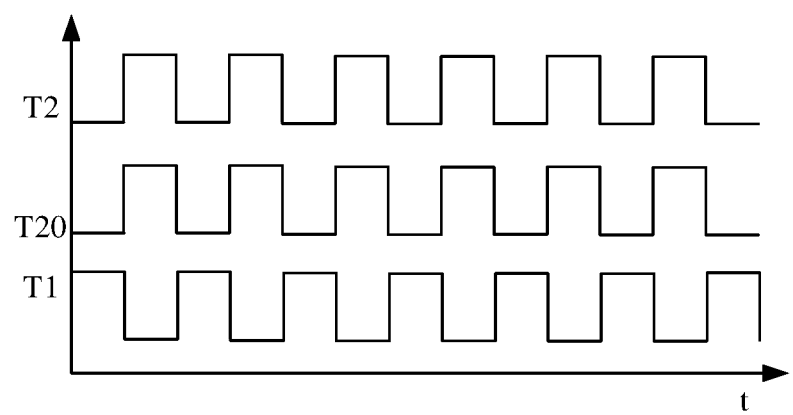

The main board chip 220 can control the capacitive fingerprint sensor film 20 and the display module 30 to work in different time periods through the sensor chip 201 and the display chip 301. As one example, in FIG. 33, when the capacitive fingerprint sensor film 20 is configured to implement the fingerprint recognition function, the sensor chip 201 controls the capacitive fingerprint sensor film 20 to work according to a first working signal T1, and the main board chip 220 obtains, from the sensor chip 201, a first synchronization signal T10 corresponding to the first working signal T1, and then instructs the display chip 301 to disable the display module 30 according to the first synchronization signal T10. As another example, in FIG. 34, when the display module 30 is configured to implement the display function, the display chip 301 controls the display module 30 to work according to a second working signal T2, and the main board chip 220 obtains, from the display chip 301, a second synchronization signal T20 corresponding to the second working signal T2, and then instructs the sensor chip 201 to disable the capacitive fingerprint sensor film 20 according to the second synchronization signal T20. According to implementations, the capacitive fingerprint sensor film 20 and the display module 30 may be implemented in a time division multiplexing manner, and a time period for sending the first working signal T1 and a time period required for sending the second working signal T2 are staggered, so as to avoid the confusion and mutual interference between the capacitive fingerprint sensor film 20 and the display module 30 in the process of using the electronic device 1000.

Figure 35:
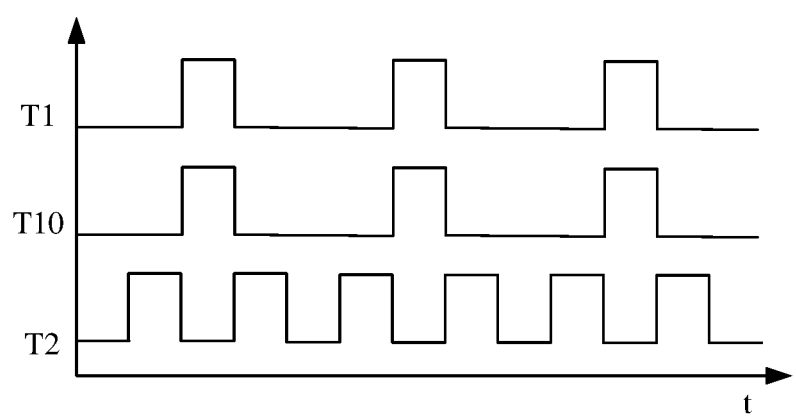

In one example, a display frequency of the display module 30 can be higher than a fingerprint detection frequency of the capacitive fingerprint sensor film 20, and there may be multiple second working signals T2 between two adjacent first working signals T1. For example, as illustrated in FIG. 35, the display frequency of the display module 30 is twice the fingerprint detection frequency of the capacitive fingerprint sensor film 20, and there are two second working signals T2 between two adjacent first working signals T1. Generally, the user mainly uses the display function of the electronic device 1000, and thus the display module 30 needs to be more frequently used than the capacitive fingerprint sensor film 20. Therefore, by setting the display frequency of the display module 30 to be higher than the fingerprint detection frequency of the capacitive fingerprint sensor film 20, the actual needs of the user can be satisfied.

In the description of the specification, the description of the reference terms "one implementation, "some implementations", "examples", or "some examples" refer to the fact that the specific characteristic, structure, or feature described in combination with the implementations or examples is contained in the at least one implementation or example. In the specification, the schematic expression of the above terms unnecessarily aims at the same implementation or example. In addition, the described specific characteristic, structure, or feature can be combined in a proper manner in any one or more implementations or examples.

Any process or method illustrated in a flow chart or herein in other manners can be understood as a module, a fragment, or a portion of codes that include one or more executable instructions for implementing a particular logical function or operations of a process. The scope of the implementations includes additional implementations in which the functions may be performed out of the order illustrated or discussed. For example, the functions can be performed in a substantially simultaneous manner or in the reverse order according to the functions involved, which should be understood by those skilled in the art.

Although some implementations are illustrated and described above, it should be understood that these implementations are illustrative examples rather than limiting the present disclosure. Various changes, modifications, substitutions, and variations could be made to the implementations by those of ordinary skilled in the art within the scope of the disclosure.

What is claimed is:

1. A display assembly, comprising:
   a flexible screen;
   a cover plate;
   a capacitive fingerprint sensor film disposed between the cover plate and the flexible screen; and
   an antireflection film disposed between the cover plate and the capacitive fingerprint sensor film, wherein the capacitive fingerprint sensor film covers a display surface of the flexible screen, to sense a fingerprint of a finger in contact with the cover plate.

2. The display assembly of claim 1, further comprising an adhesive layer, wherein the adhesive layer comprises a first optical adhesive layer and a second optical adhesive layer, wherein the cover plate is attached to the capacitive fingerprint sensor film via the first optical adhesive layer in full lamination, and the capacitive fingerprint sensor film is attached to the flexible screen via the second optical adhesive layer in full lamination or in edge lamination.

3. The display assembly of claim 1, further comprising an adhesive layer, wherein the adhesive layer comprises a first optical adhesive layer and a second optical adhesive layer, wherein the cover plate is attached to the capacitive fingerprint sensor film via the first optical adhesive layer in full lamination, and the cover plate is attached to the flexible screen via the second optical adhesive layer in edge lamination.

4. The display assembly of claim 3, wherein the first optical adhesive layer is made from at least one of an optically clear adhesive (OCA), a PolyVinyl Butyral (PVB) film, or a Die attach film (DAF), and the second optical adhesive layer is made from at least one of an OCA, a PVB film, or a DAF.

5. The display assembly of claim 1, wherein the cover plate is made of at least one of Sapphire, glass or a composite board, or made from at least one of Polyimide (PI) or Polyethylene terephthalate (PET), wherein the composite board is made from Polymethyl methacrylate (PMMA) and Polycarbonate (PC).

6. The display assembly of claim 1, wherein the capacitive fingerprint sensor film covers the whole display surface.

7. The display assembly of claim 1, wherein the capacitive fingerprint sensor film is made of glass or made from PI, and a circuit of the capacitive fingerprint sensor film is made from at least one of metal, Indium tin oxide (ITO), or Nano silver paste.

8. The display assembly of claim 1, wherein the cover plate has a light-exiting surface and a back surface opposite the light-exiting surface, the back surface of the cover plate faces the capacitive fingerprint sensor film, and the back surface of the cover plate is provided with an ink layer.

9. The display assembly of claim 1, further comprising a reinforcing layer, wherein the reinforcing layer is disposed between the capacitive fingerprint sensor film and the flexible screen.

10. The display assembly of claim 9, further comprising an adhesive layer, wherein the adhesive layer comprises a first optical adhesive layer, a second optical adhesive layer, and a third optical adhesive layer, wherein the cover plate is attached to the capacitive fingerprint sensor film via the first optical adhesive layer in full lamination, the capacitive fingerprint sensor film is attached to the reinforcing layer via the second optical adhesive layer in full lamination or in edge lamination, and the reinforcing layer is attached to the flexible screen via the third optical adhesive layer in full lamination or in edge lamination.

11. The display assembly of claim 1, further comprising a polarizer, wherein the polarizer is disposed between the cover plate and the capacitive fingerprint sensor film.

12. The display assembly of claim 11, further comprising an adhesive layer, wherein the adhesive layer comprises a first optical adhesive layer and a second optical adhesive layer, wherein the cover plate is attached to the polarizer via the first optical adhesive layer in full lamination, and the capacitive fingerprint sensor film is attached to the flexible screen via the second optical adhesive layer in full lamination or in edge lamination.

13. The display assembly of claim 11, further comprising an adhesive layer, wherein the adhesive layer comprises a first optical adhesive layer and a second optical adhesive layer, wherein the cover plate is attached to the polarizer via the first optical adhesive layer in full lamination, and the cover plate is attached to the flexible screen via the second optical adhesive layer in edge lamination.

14. The display assembly of claim 1, further comprising a high impedance film, wherein the capacitive fingerprint sensor film comprises a sensor substrate and a sensor circuit layer, the sensor circuit layer is disposed on the sensor substrate, and the high impedance film is disposed between the sensor circuit layer and the sensor substrate.

15. The display assembly of claim 14, wherein the high impedance film has a light-exiting surface and a back surface opposite the light-exiting surface, the light-exiting surface of the high impedance film faces the sensor circuit layer, and the back surface of the high impedance film faces the sensor substrate.

16. An electronic device, comprising:
a display assembly comprising:
a flexible screen;
a cover plate;
a capacitive fingerprint sensor film disposed between the cover plate and the flexible screen;
an antireflection film disposed between the cover plate and the capacitive fingerprint sensor film, wherein the capacitive fingerprint sensor film covers a display surface of the flexible screen, to sense a fingerprint of a finger in contact with the cover plate; and
a casing coupled with the display assembly.

17. A method for assembling a display assembly, comprising:
providing a flexible screen, a capacitive fingerprint sensor film, a cover plate, and an antireflection film;
arranging the antireflection film between the cover plate and the capacitive fingerprint sensor film;
arranging the capacitive fingerprint sensor film between the cover plate and the flexible screen; and
covering, with the capacitive fingerprint sensor film, a display surface of the flexible screen to sense a fingerprint of a finger in contact with the cover plate.

18. The method of claim 17, further comprising:
attaching, via a first optical adhesive layer, the cover plate to the capacitive fingerprint sensor film in full lamination; and
attaching, via a second optical adhesive layer, the capacitive fingerprint sensor film to the flexible screen in full lamination or in edge lamination.

19. The method of claim 17, further comprising:
attaching, via a first optical adhesive layer, the cover plate to the capacitive fingerprint sensor film in full lamination; and
attaching, via a second optical adhesive layer, the cover plate to the flexible screen in edge lamination.

* * * * *